(12) United States Patent
Kwasiborski

(10) Patent No.: US 9,190,821 B2
(45) Date of Patent: Nov. 17, 2015

(54) MOUNT HAVING A PUSH NUT AND A POST

(75) Inventor: Steven R. Kwasiborski, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 206 days.

(21) Appl. No.: 12/606,329

(22) Filed: Oct. 27, 2009

(65) Prior Publication Data

US 2010/0104394 A1  Apr. 29, 2010

Related U.S. Application Data

(60) Provisional application No. 61/109,307, filed on Oct. 29, 2008.

(51) Int. Cl.
*F16B 21/00* (2006.01)
*H02G 3/32* (2006.01)
*F16B 37/08* (2006.01)

(52) U.S. Cl.
CPC .............. *H02G 3/32* (2013.01); *F16B 37/0842* (2013.01)

(58) Field of Classification Search
CPC ..... H02G 3/32; F16B 37/0842; F16B 19/002; F16B 37/0864; F16B 37/02; F16B 43/00; E02F 9/2841
USPC ........... 411/512, 433, 437, 542, 371.1, 371.2, 411/400
See application file for complete search history.

(56) References Cited

U.S. PATENT DOCUMENTS

| | | |
|---|---|---|
| 1,069,451 A | 8/1913 | Martson |
| 3,250,505 A | 5/1966 | Rodman, Sr. et al. |
| 3,258,819 A | 7/1966 | Weckesser |
| 3,486,725 A | 12/1969 | Hidassy |
| 3,556,447 A | 1/1971 | Jenkins et al. |
| 3,632,070 A | 1/1972 | Thayer |
| 3,744,096 A | 7/1973 | Kok |
| 3,819,139 A | 6/1974 | Jemison |
| 3,900,922 A | 8/1975 | McCormick |
| 3,913,876 A | 10/1975 | McSherry |
| 4,269,379 A | 5/1981 | McCormick |
| 4,272,870 A | 6/1981 | McCormick |
| 4,358,080 A | 11/1982 | Wolker |
| 4,435,111 A * | 3/1984 | Mizusawa ............ 411/437 |
| 4,458,385 A | 7/1984 | Espinoza |
| 4,557,023 A | 12/1985 | Six et al. |
| 4,680,834 A | 7/1987 | Andre et al. |
| 4,728,236 A * | 3/1988 | Kraus ............ 411/437 |
| 4,756,654 A * | 7/1988 | Clough ............ 411/437 |
| 4,768,741 A | 9/1988 | Logsdon |

(Continued)

FOREIGN PATENT DOCUMENTS

| | | |
|---|---|---|
| CA | 695251 A | 9/1964 |
| DE | 1475035 A1 | 4/1969 |

(Continued)

*Primary Examiner* — Gary Estremsky

(74) *Attorney, Agent, or Firm* — Christopher S. Clancy; Christopher K. Marlow

(57) ABSTRACT

A mount having a post and a push nut. The post includes a longitudinal axis. The push nut is connected to the post. The push nut includes an opening for receiving the post along the longitudinal axis and at least one locking wedge rotatably connected to the push nut and extending into the opening. The at least one locking wedge allows the push nut to slide along the longitudinal axis of the post in a first direction and prevents the push nut from sliding along the longitudinal axis of the post in a second direction opposite the first direction.

5 Claims, 38 Drawing Sheets

(56) References Cited

U.S. PATENT DOCUMENTS

| | | | |
|---|---|---|---|
| 4,828,444 A | 5/1989 | Oshida | |
| 4,925,136 A | 5/1990 | Knott | |
| 4,934,889 A | 6/1990 | Kurosaki | |
| 4,999,019 A * | 3/1991 | Kraus | 411/512 |
| 5,098,242 A | 3/1992 | Schaty | |
| 5,121,524 A | 6/1992 | Mortensen | |
| 5,131,613 A | 7/1992 | Kamiya et al. | |
| 5,302,070 A | 4/1994 | Kameyama et al. | |
| 5,332,179 A | 7/1994 | Kuffel et al. | |
| 5,337,983 A | 8/1994 | Mailey | |
| 5,386,615 A | 2/1995 | Bernard | |
| 5,653,409 A | 8/1997 | White, Jr. et al. | |
| 5,730,399 A | 3/1998 | Baginski | |
| 5,760,338 A | 6/1998 | Suzuki | |
| 5,816,762 A | 10/1998 | Miura et al. | |
| 5,820,048 A | 10/1998 | Shereyk et al. | |
| 5,906,464 A | 5/1999 | Wedenig | |
| 6,196,751 B1 | 3/2001 | Khokhar | |
| 6,364,257 B1 | 4/2002 | Holder | |
| 6,533,226 B2 | 3/2003 | Geiger | |
| 6,718,597 B2 | 4/2004 | Geiger | |
| 7,114,901 B2 * | 10/2006 | Maruyama et al. | 411/353 |
| 7,134,633 B2 | 11/2006 | Logan | |
| 7,322,784 B2 * | 1/2008 | Castro et al. | 411/433 |
| 2003/0147720 A1 * | 8/2003 | Kovac | 411/433 |
| 2005/0242247 A1 * | 11/2005 | Geiger | 248/74.3 |
| 2006/0099049 A1 * | 5/2006 | Peterson | 411/433 |

FOREIGN PATENT DOCUMENTS

| | | |
|---|---|---|
| DE | 20102935 U1 | 6/2002 |
| DE | 202005015875 U1 | 2/2007 |
| EP | 0751597 A1 | 2/1997 |
| FR | 2660470 A1 | 10/1991 |

* cited by examiner

US 9,190,821 B2

MOUNT HAVING A PUSH NUT AND A POST

CROSS-REFERENCE TO RELATED APPLICATION

This application claims priority to U.S. Provisional Patent Application No. 61/109,307, filed Oct. 29, 2008, the subject matter of which is incorporated by reference in its entirety.

FIELD OF THE INVENTION

The present invention relates to a mount. More particularly, the present invention relates to a mount having a push nut and a post.

BACKGROUND OF THE INVENTION

It is desirable to route one or more elongate objects, such as cables or hoses, along a support member, such as a frame rail for a truck. The elongate objects are formed into a bundle using a fastener, such as a cable tie or a hose clamp. The fastener is secured to a mount, which in turn, is secured to the support member. For example, one or more cables are formed into a bundle using a cable tie, and the cable tie is secured to a cable tie mount, which in turn, is secured to the frame rail. Existing mounts include, for example, plastic-dipped metal "L" brackets fastened to the frame rail with Huck bolts. While providing a point of attachment, as well as support for the cable tie, and therefore, the bundle of cables, existing cable tie mounts are both difficult and time consuming to install. Additionally, existing cable tie mounts are limited to a specific application.

Therefore, there is a need for a mount that is easy to install. Additionally, there is a need for a mount that is versatile, and thus, easily adapted to a variety of applications.

SUMMARY OF THE INVENTION

Certain embodiments of the present invention provide a mount. The mount includes a post and a push nut. The post includes a longitudinal axis. The push nut is connected to the post. The push nut includes an opening for receiving the post along the longitudinal axis and at least one locking wedge rotatably connected to the push nut and extending into the opening. The at least one locking wedge allows the push nut to slide along the longitudinal axis of the post in a first direction and prevents the push nut from sliding along the longitudinal axis of the post in a second direction opposite the first direction.

DETAILED DESCRIPTION OF THE INVENTION

FIGS. 1-32 illustrate a mount 100 according to one or more embodiments of the present invention. The mount 100 includes a post 200 and a push nut 300, both of which are described in more detail below.

Figure 1:
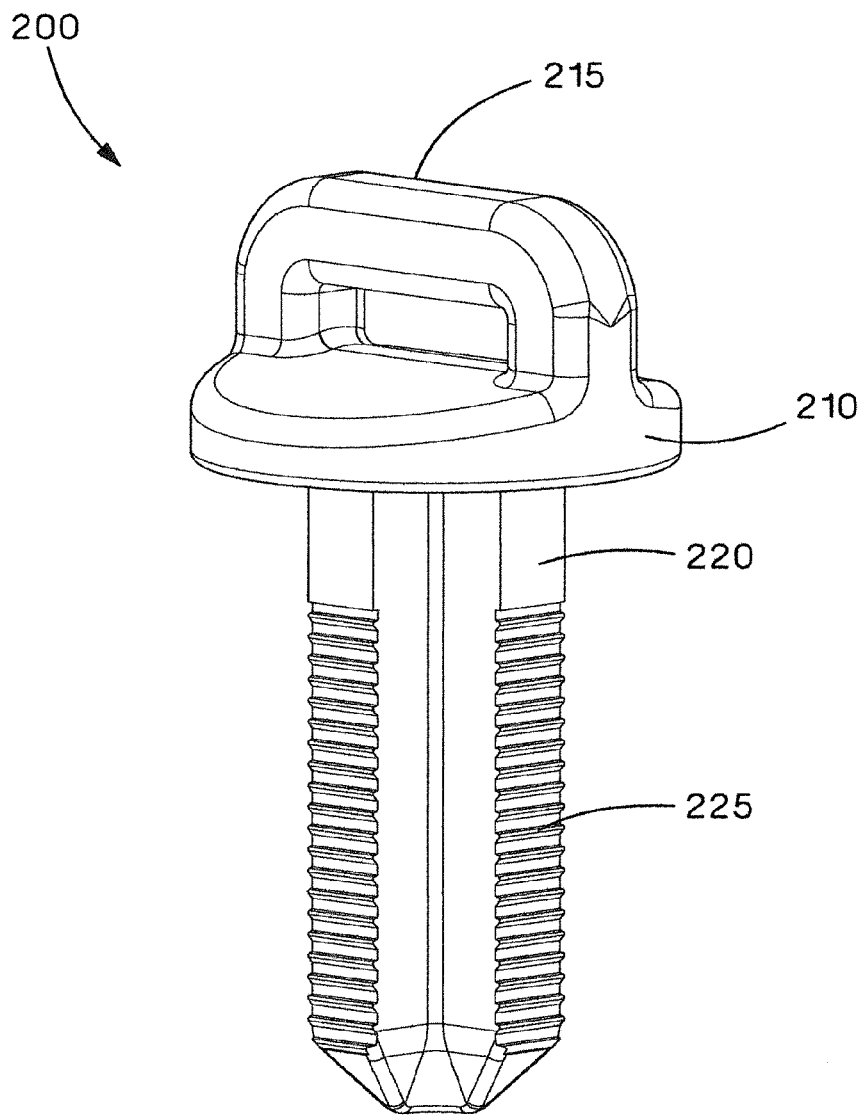
FIG. 1 is a perspective view of a post according to an embodiment of the present invention.
Figure 2:
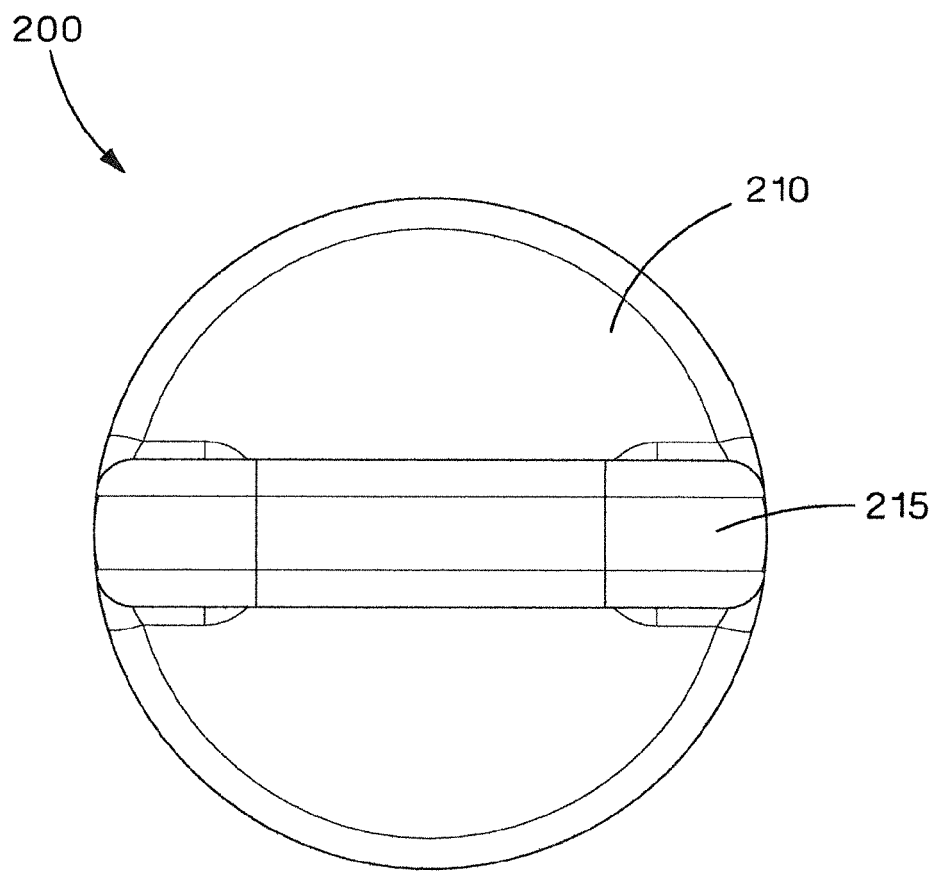
FIG. 2 is a top view of the post of FIG. 1.

Referring to FIGS. 1-5, the post 200 includes a head 210. As best seen in FIG. 1, the head 210 includes a rung 215.

Figure 3:
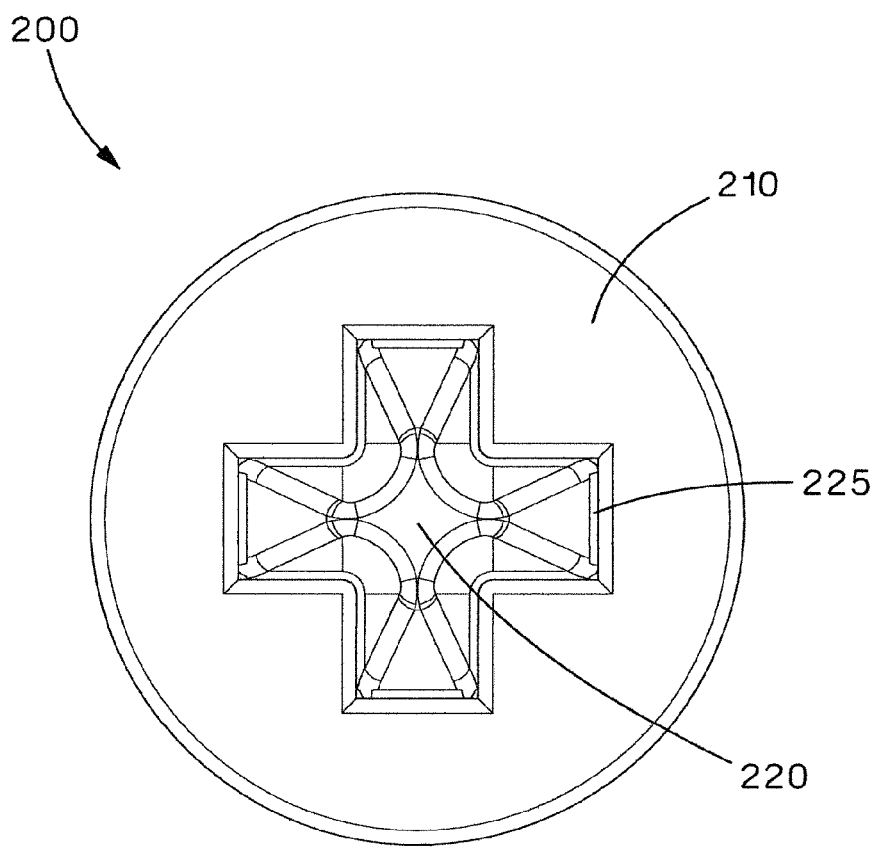
FIG. 3 is a bottom view of the post of FIG. 1.

Additionally, the post 200 includes a shaft 220. The shaft 220 includes one or more sets of teeth 225. Preferably, the shaft 220 is shaped like a cross or a plus-sign, as best seen in FIG. 3, but it is likewise contemplated that the shaft 220 may be any shape, such as a circle, a square, a triangle, a star, or an "I".

Figure 4:
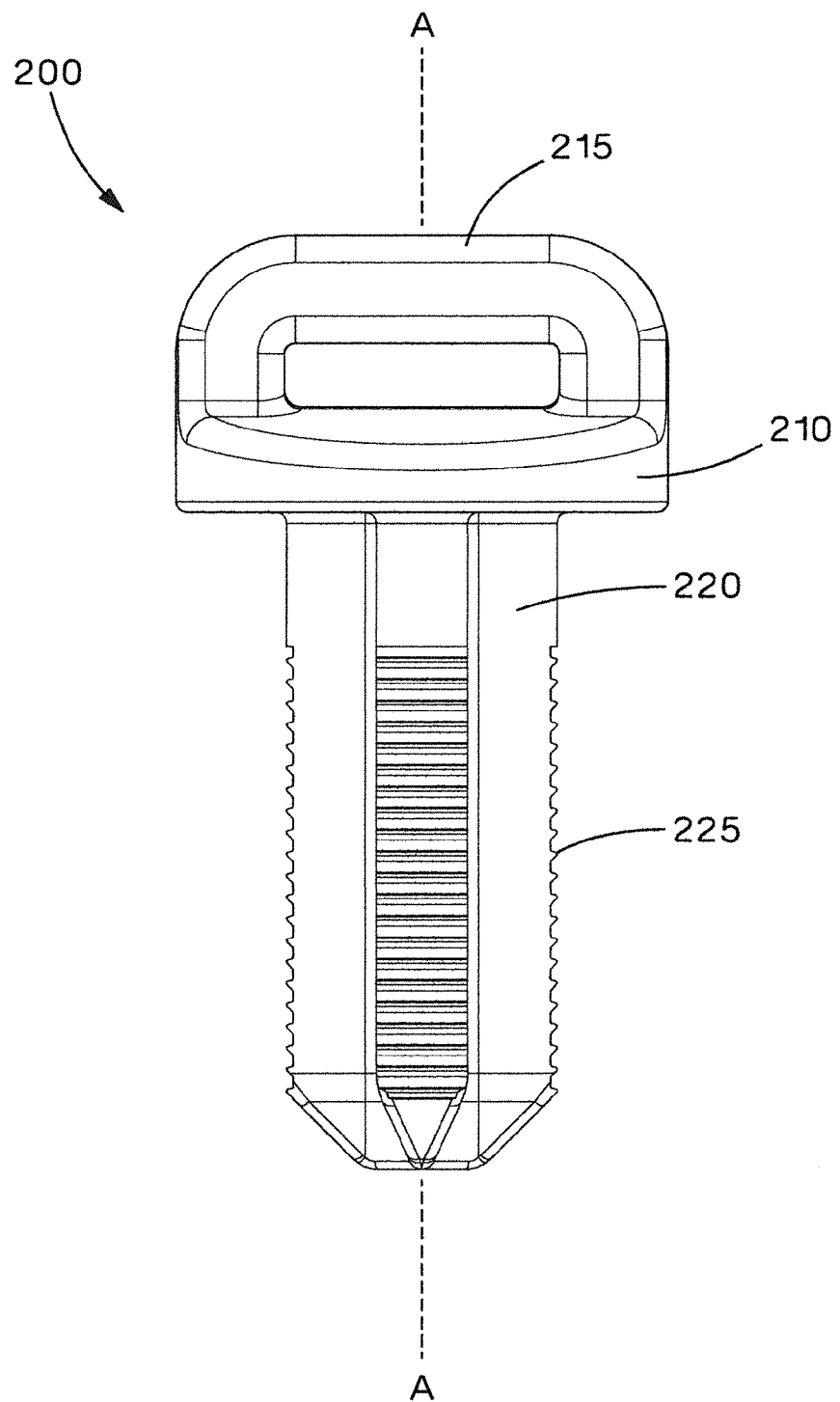
FIG. 4 is a front view of the post of FIG. 1.
Figure 5:
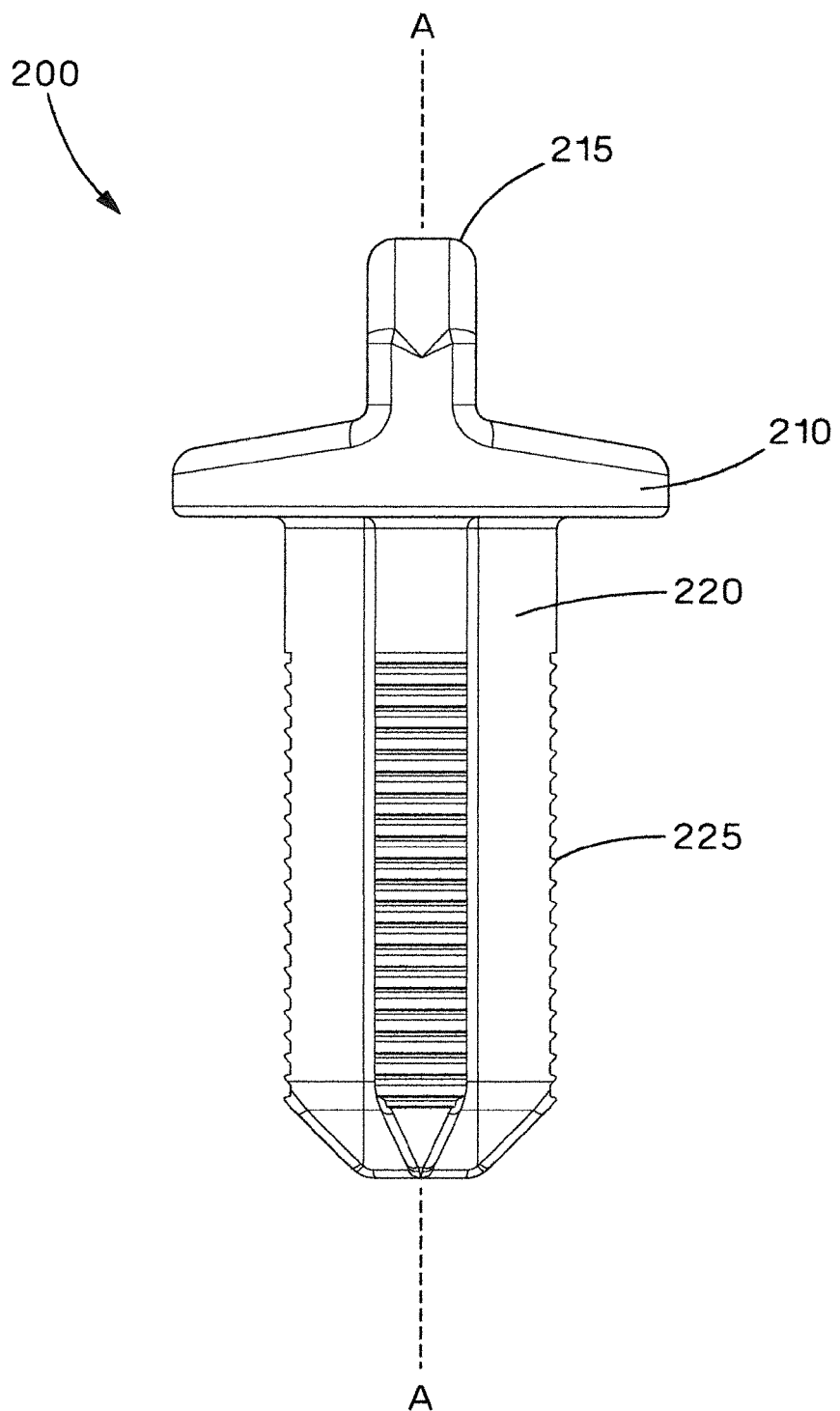
FIG. 5 is a side view of the post of FIG. 1.

As best seen in FIG. 4 and FIG. 5, the post 200 includes a longitudinal axis A.

Figure 6:
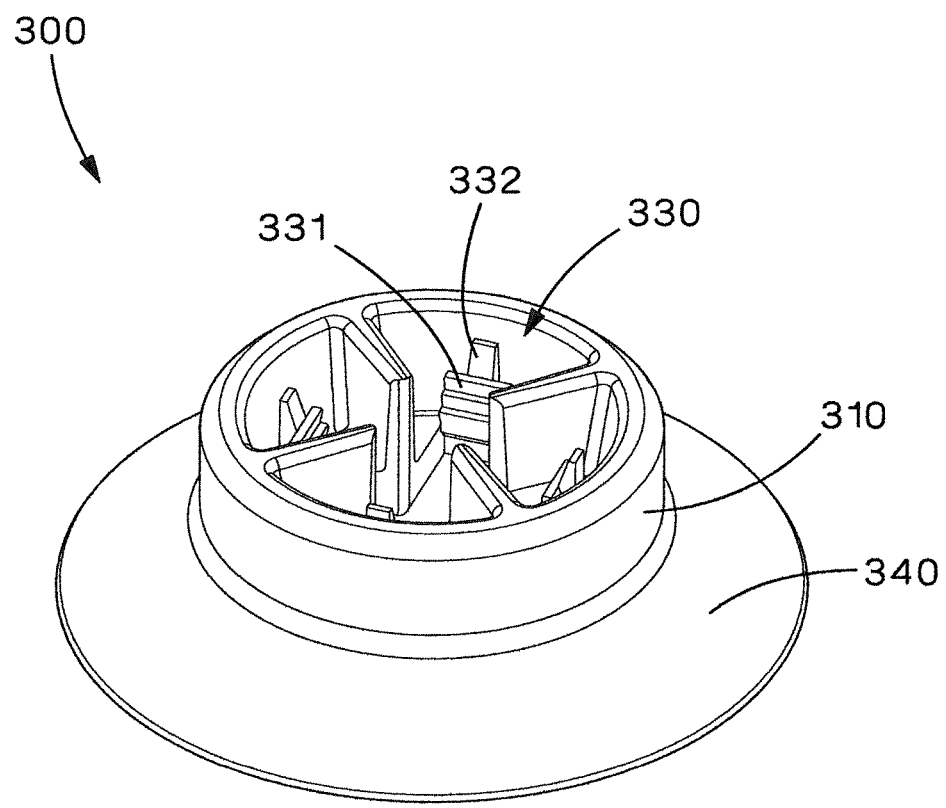
FIG. 6 is a perspective view of a push nut according to an embodiment of the present invention.
Figure 9:
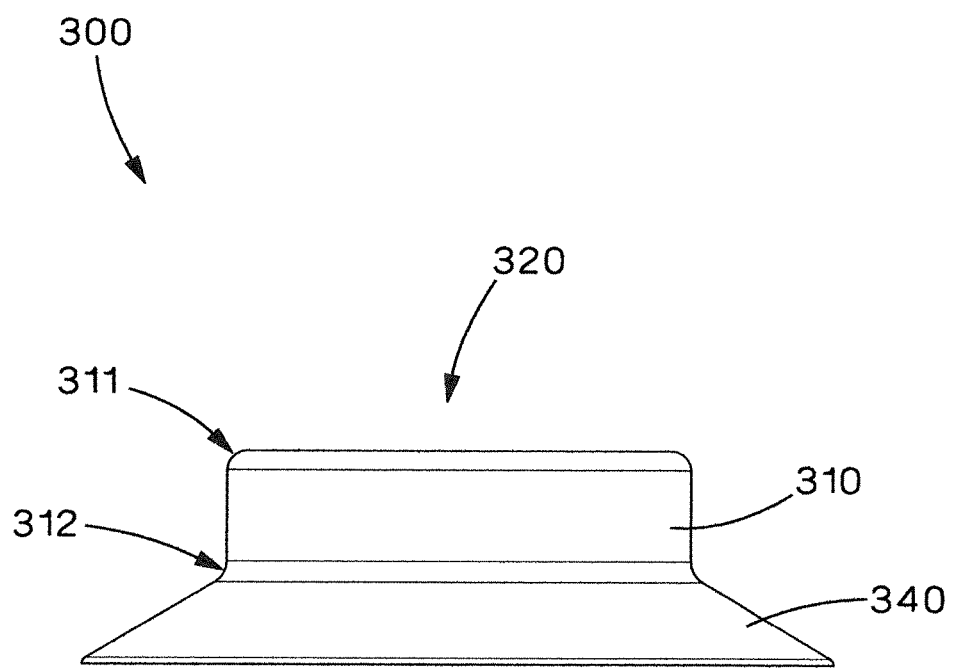
FIG. 9 is a front view of the push nut of FIG. 6.

Referring to FIGS. 6-9, the push nut 300 includes a body 310. Preferably, the body 310 is circular or cylindrical in shape, as best seen in FIG. 6, but it is likewise contemplated that the body 310 may be any shape, such as a square, a rectangle, or a hexagon. As best seen in FIG. 9, the body 310 includes a top portion 311 and a bottom portion 312.

Figure 7:
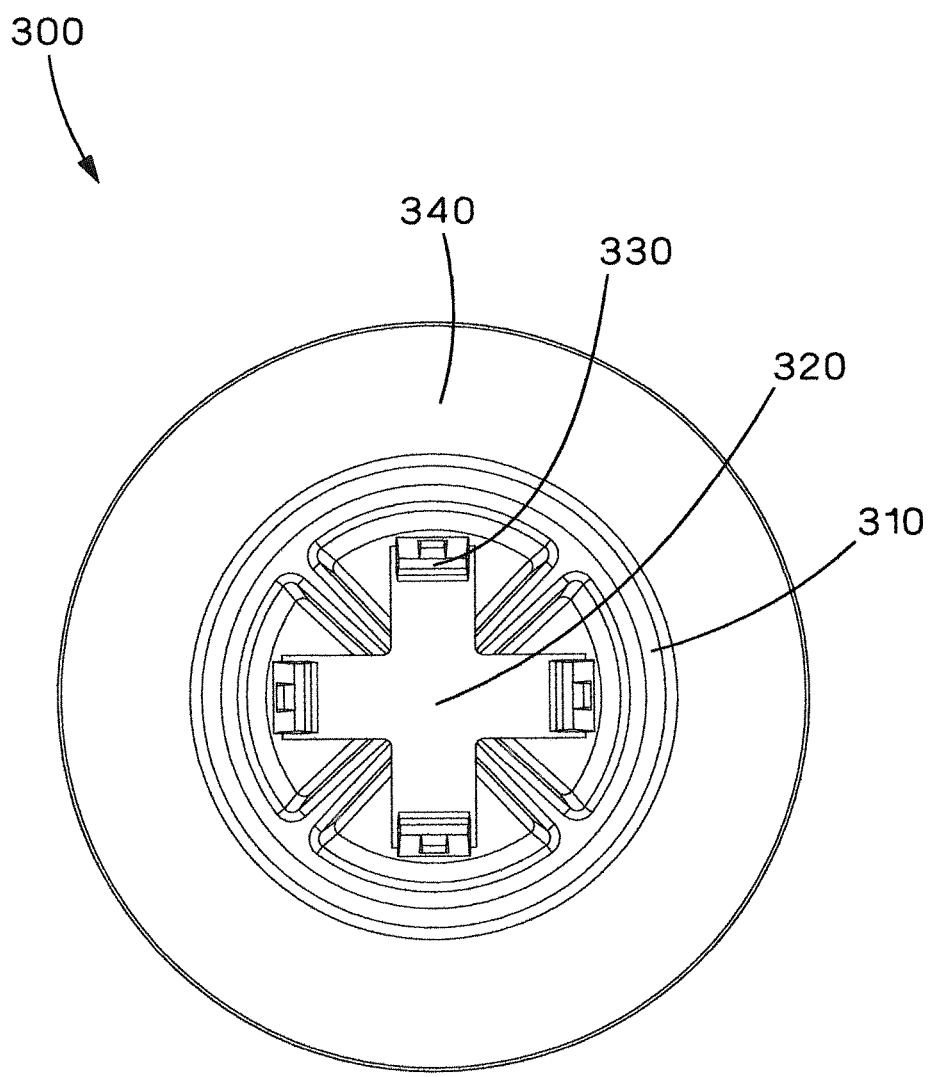
FIG. 7 is a top view of the push nut of FIG. 6.
Figure 8:
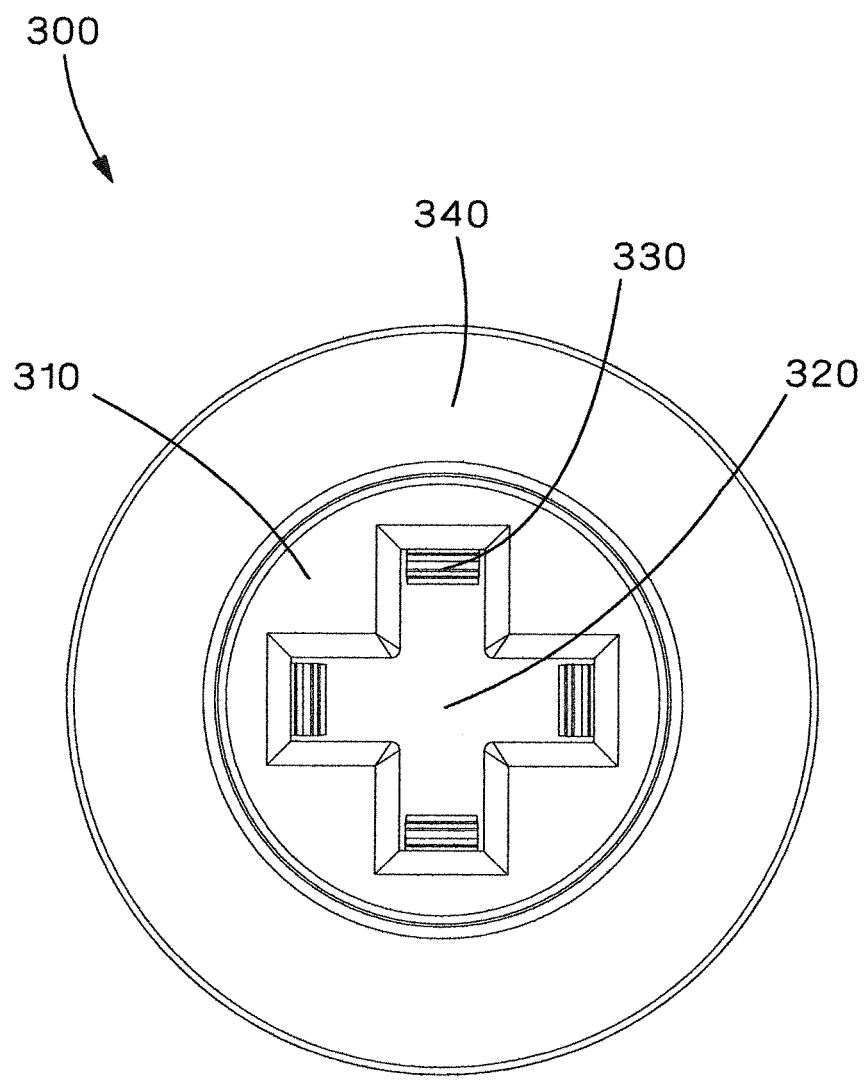
FIG. 8 is a bottom view of the push nut of FIG. 6.

Additionally, the push nut 300 includes an opening 320. The opening 320 is centrally located on the body 310. Preferably, the shape of the push nut 300, or more particularly, the opening 320, matches the shape of the post 200, or more particularly, the shaft 220. For example, as best seen in FIG. 7, the opening 320 is shaped like a cross or a plus sign, but it is likewise contemplated that the opening 320 may be any shape, such as a circle, a square, a triangle, a star, or an "I".

Additionally, the push nut 300 includes one or more locking wedges 330. The locking wedges 330 are rotatably connected to the body 310 and extend into the opening 320. Each of the locking wedges 330 includes a set of teeth 331 and a release arm 332.

Figure 14:
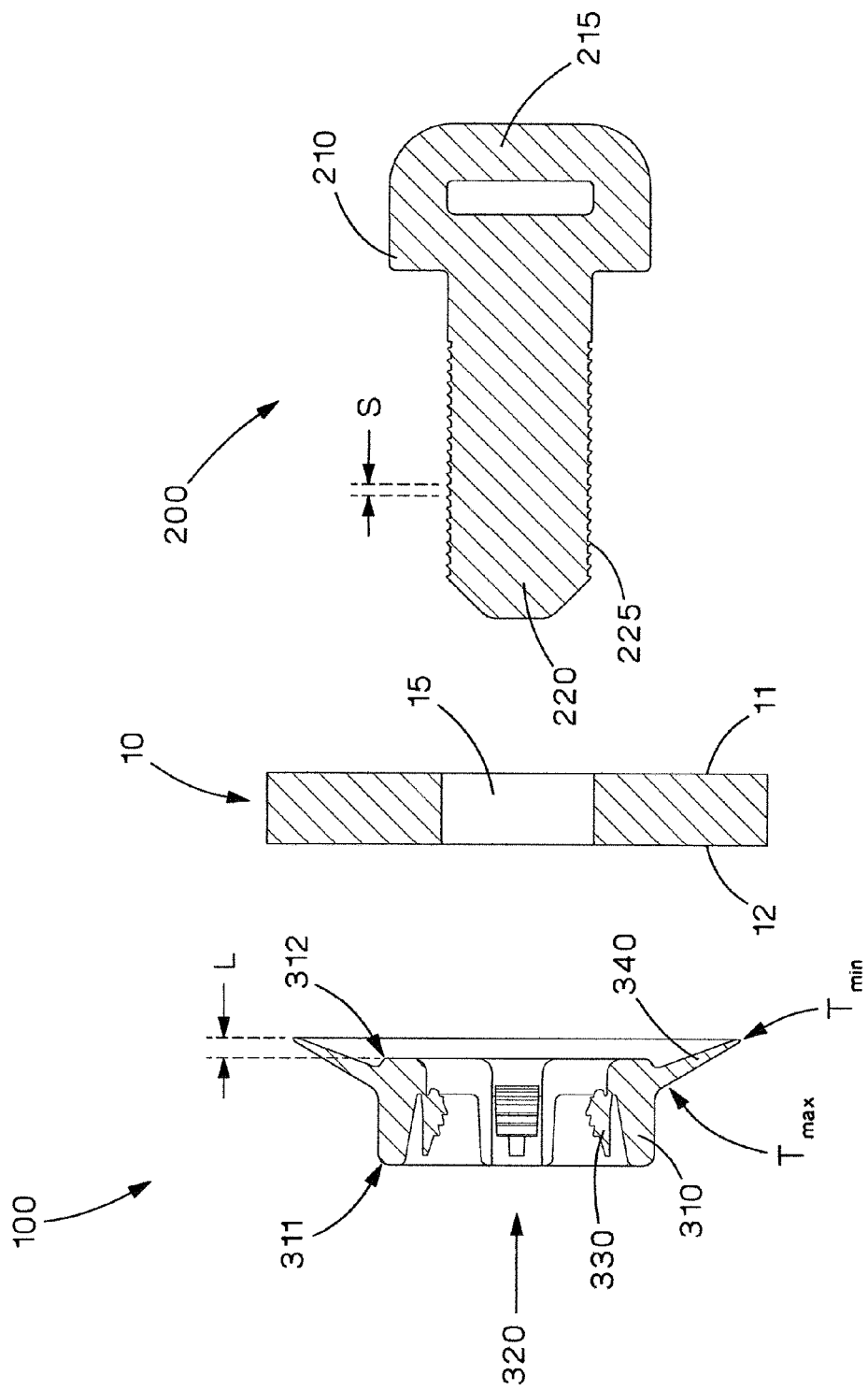
FIG. 14 is an exploded view of FIG. 13.
Figure 15:
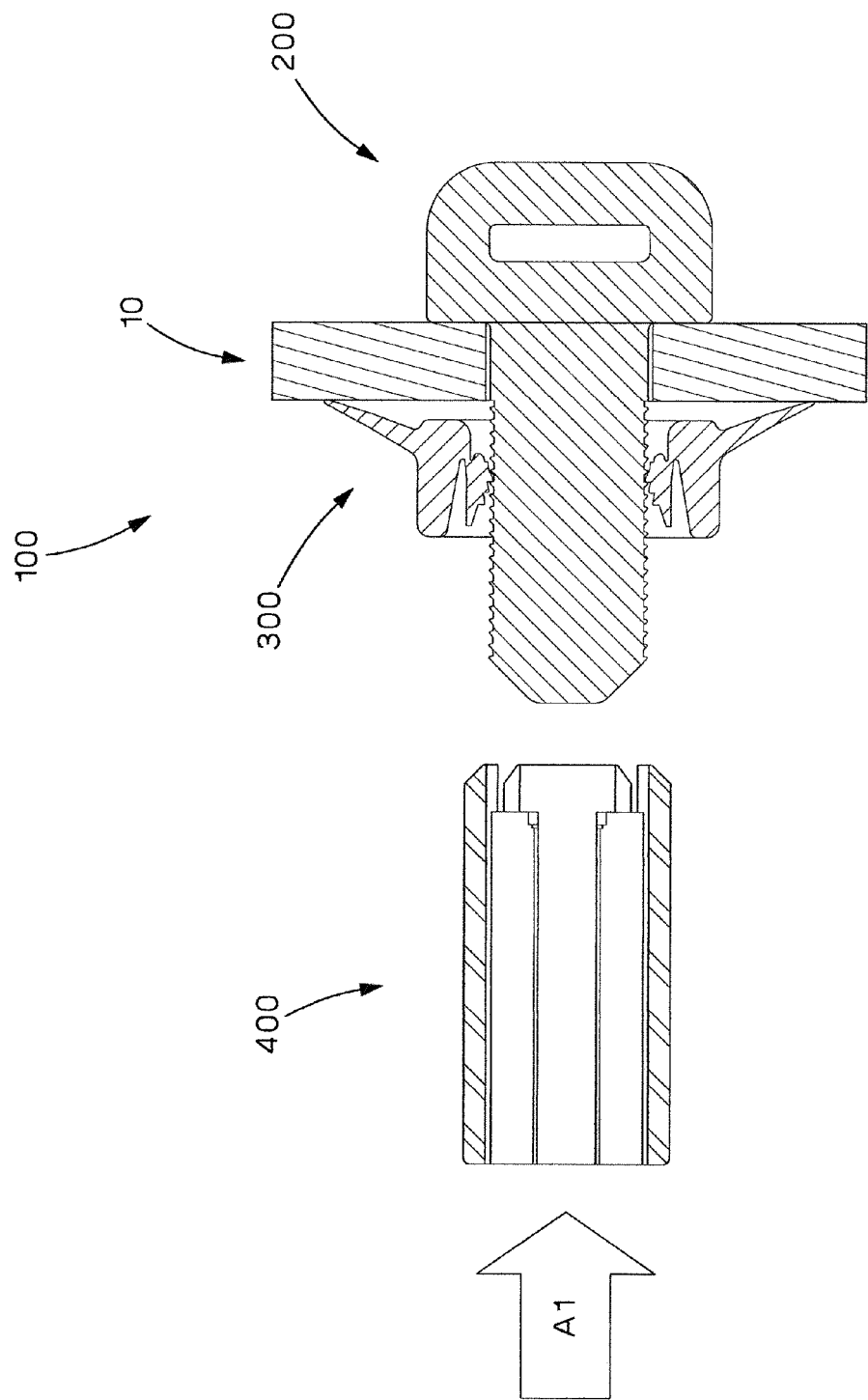
FIGS. 15-18 illustrate a removal tool at various stages of removing a push nut from a post according to an embodiment of the present invention.
Figure 16:
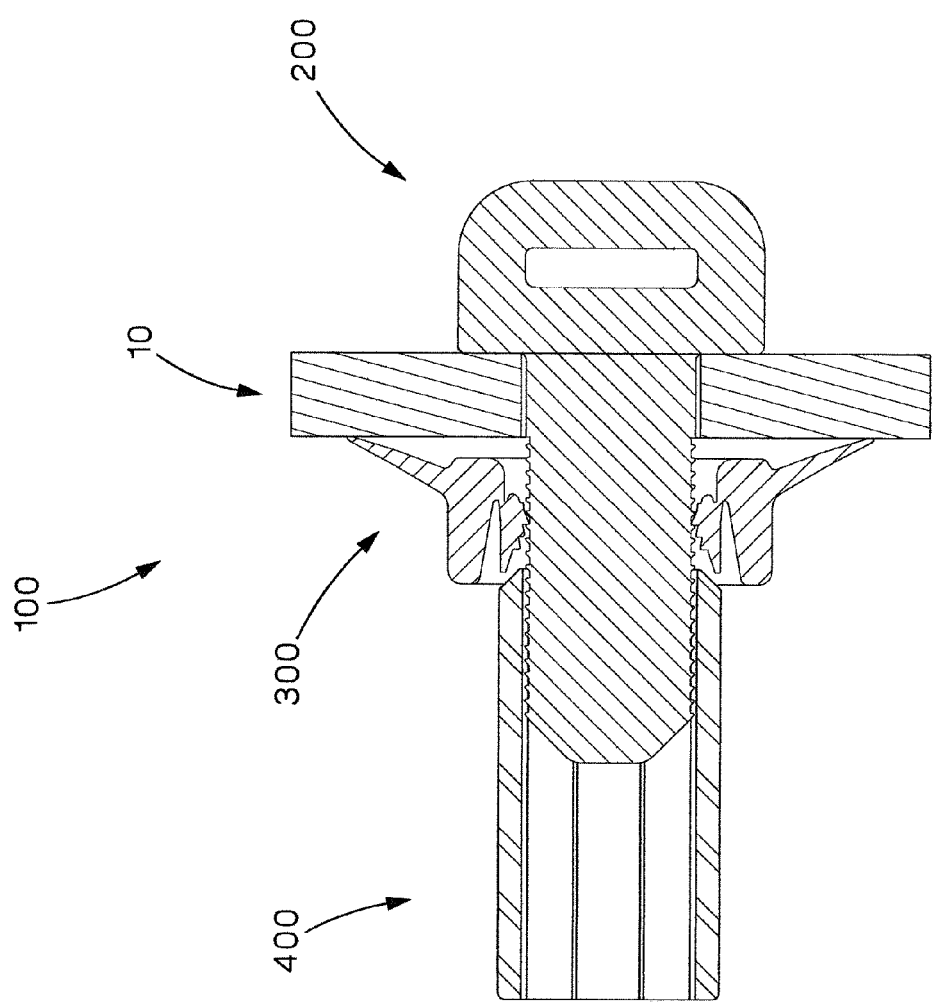
Figure 33:
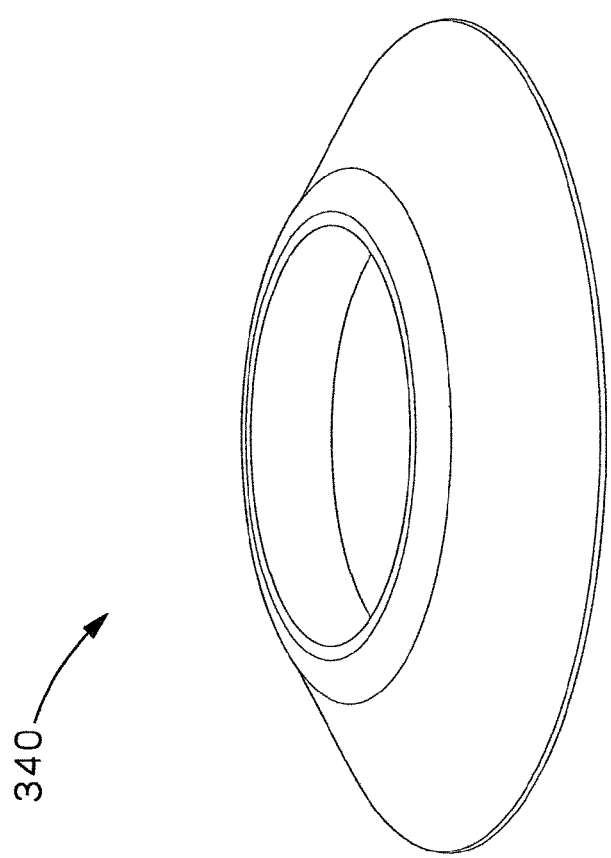
FIG. 33 is a top perspective view of a skirt according to an alternative embodiment of the present invention.
Figure 34:
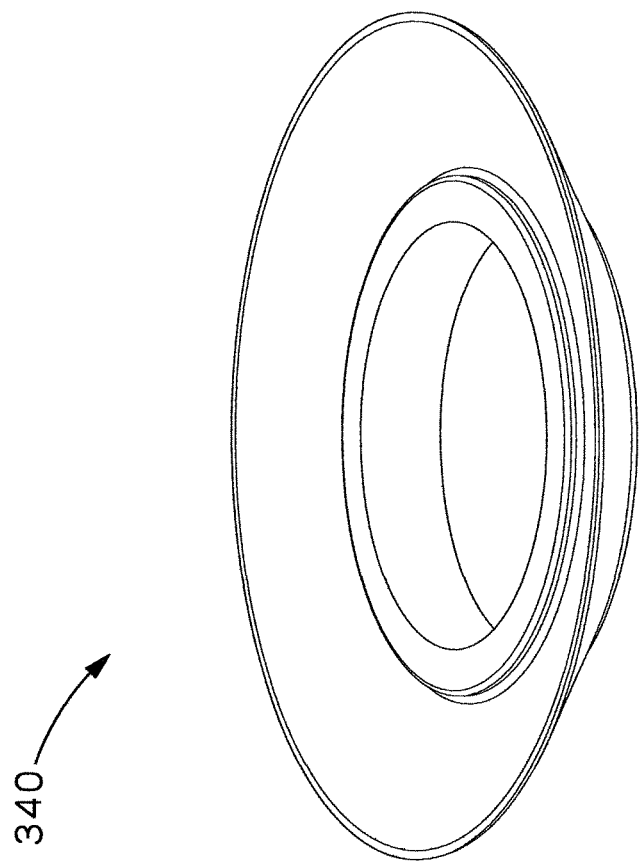
FIG. 34 is a bottom perspective view of the skirt of FIG. 33.
Figure 35:
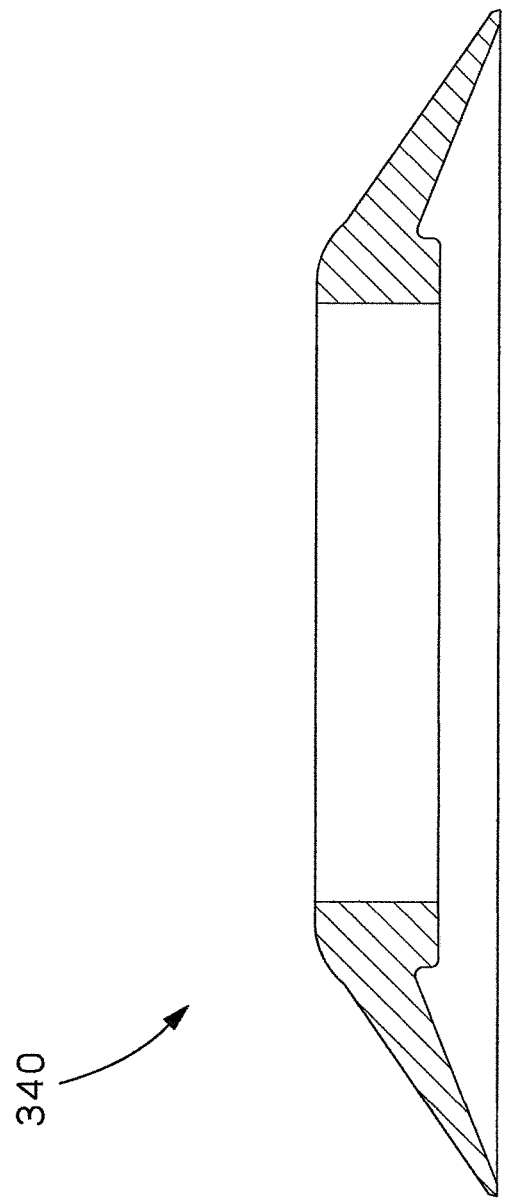
FIG. 35 is a cross-sectional view of the skirt of FIG. 33.
Figure 36:
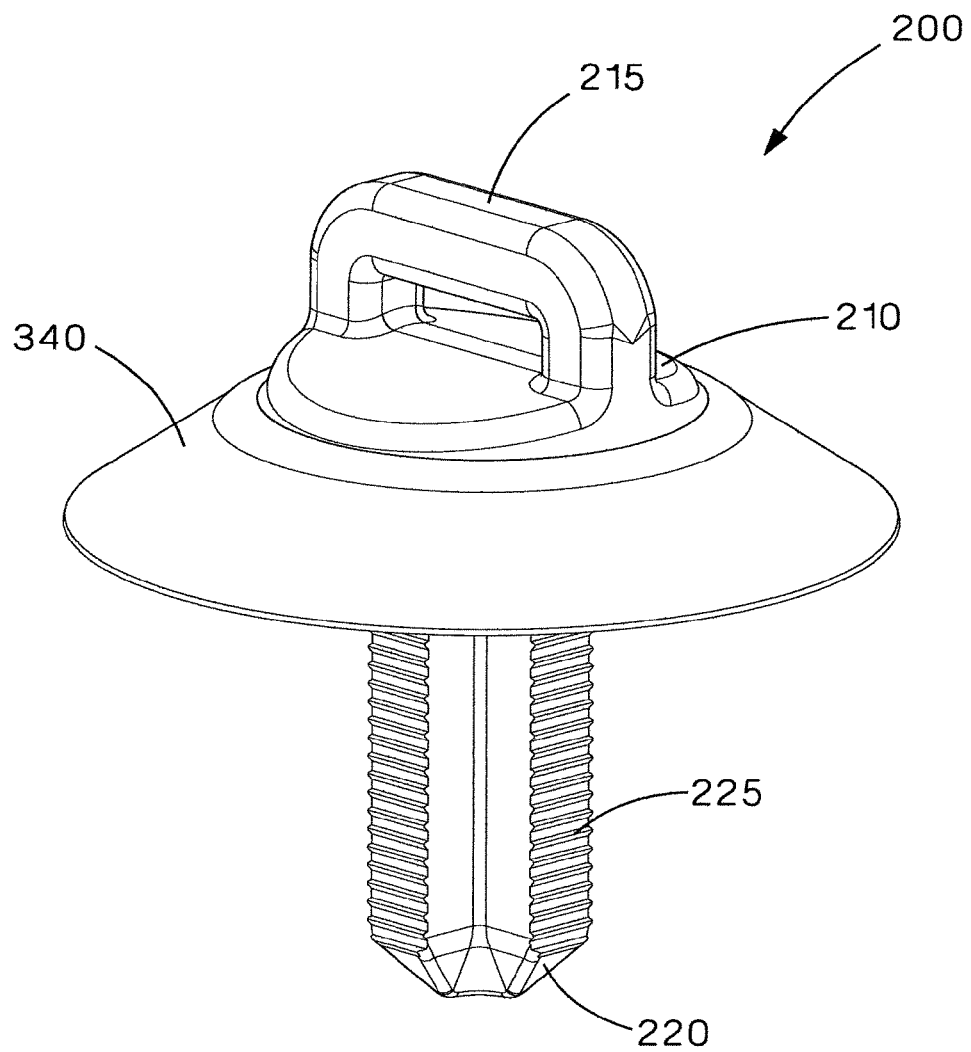
FIG. 36 is a top perspective view of the skirt of FIG. 33 connected to the push nut of FIG. 6.

Additionally, the push nut 300 includes a skirt 340. As best seen in FIG. 6, the skirt 340 is frusto-conical in shape and resembles a quoit. The skirt 340 wraps around the bottom portion 312 of the body 310, sloping downwardly and outwardly therefrom. As best seen in FIG. 14, the skirt 340 is integrally formed with the body 310. However, as shown in FIGS. 33-35, the skirt 340 may be a separate component connected to the body 310. Alternatively, as shown in FIG. 36, the skirt 340 may be connected to or integrally formed with the head 210 of the post 200.

Figure 37:
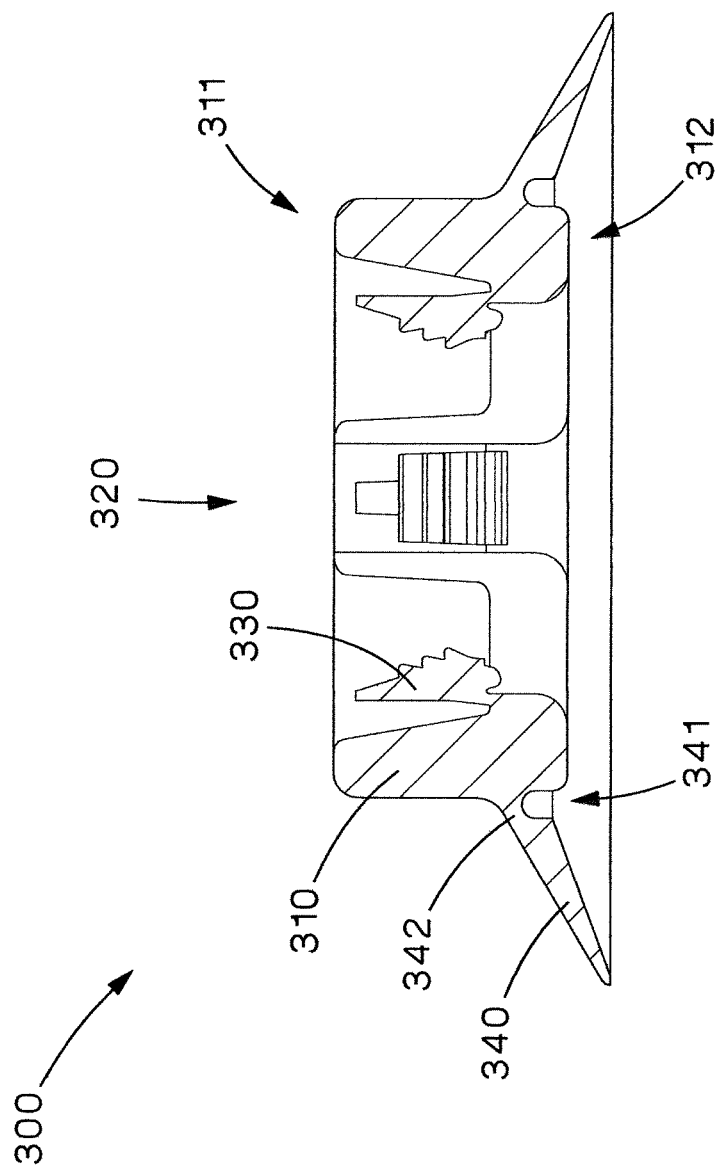
FIG. 37 is a cross-sectional view of a push nut according to an alternative embodiment of the present invention.

Additionally, as best seen in FIG. 14, the thickness of the skirt 320 tapers from a maximum thickness Tmax at the bottom portion 312 of the body 310 to a minimum thickness Tmin at the distal end of the skirt 320. Alternatively, as shown in FIG. 37, the skirt 340 may include a groove 341 near the bottom portion 312 of the body 310, which forms a living hinge 342.

Figure 10:
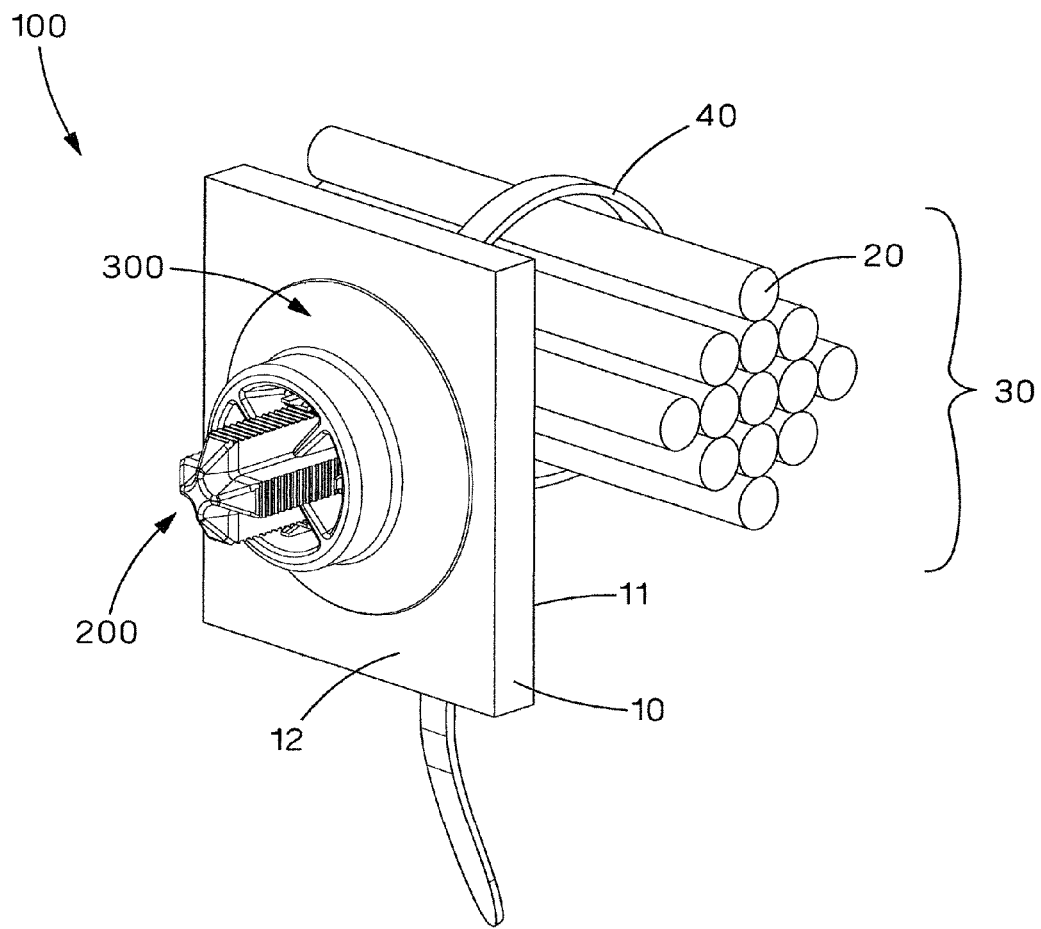
FIG. 10 is a perspective view of a mount according to an embodiment of the present invention.
Figure 11:
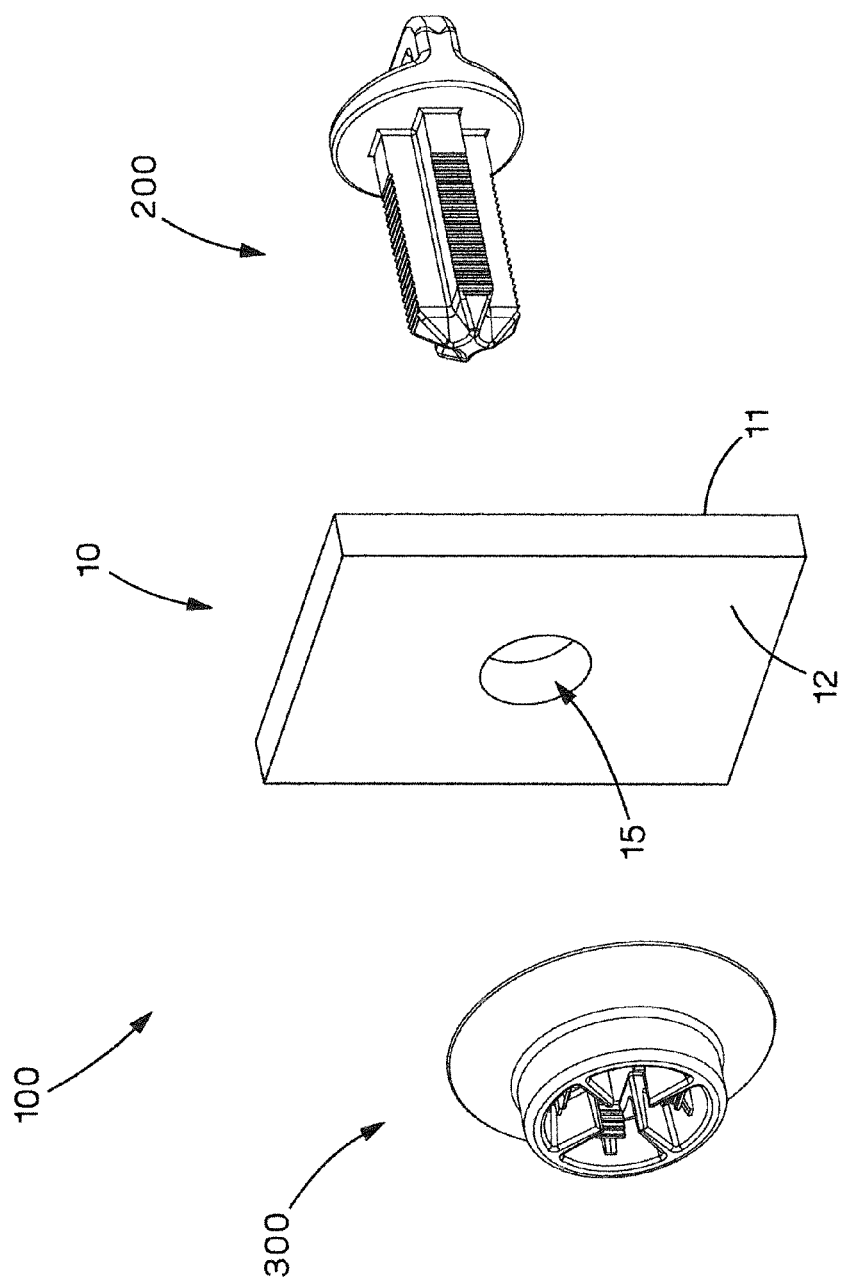
FIG. 11 is an exploded view of the mount of FIG. 10.
Figure 12:
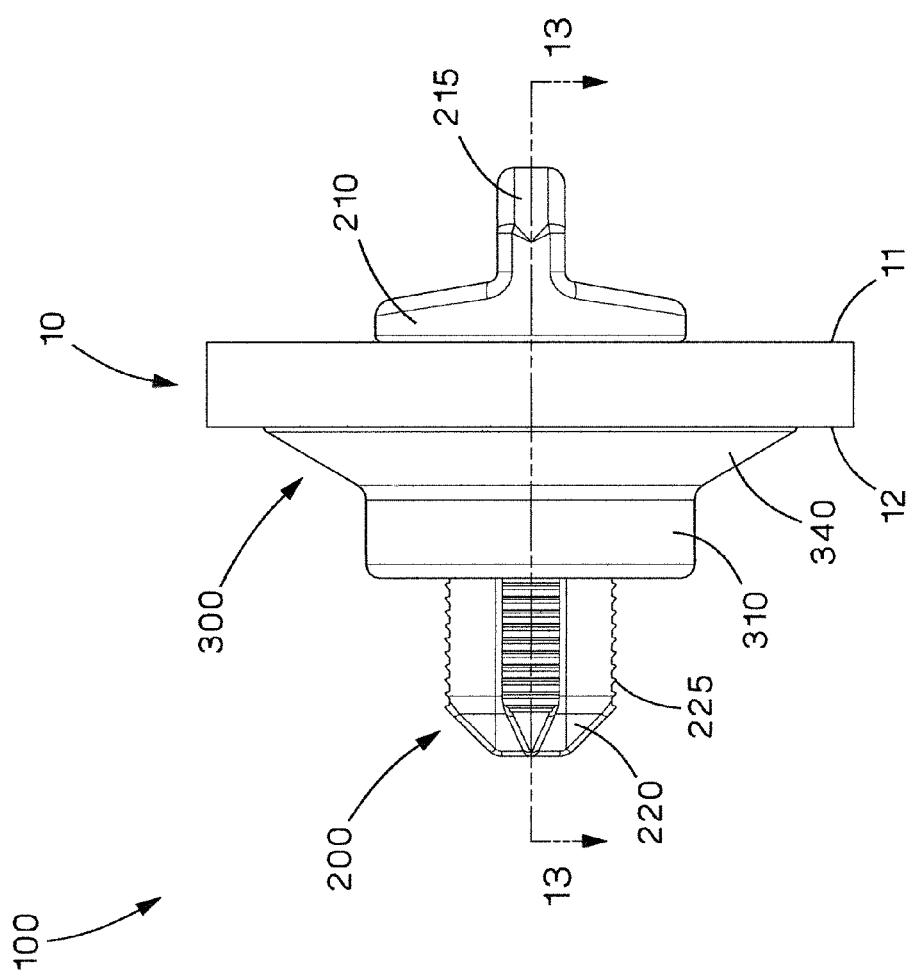
FIG. 12 is a side view of the mount of FIG. 10.
Figure 13:
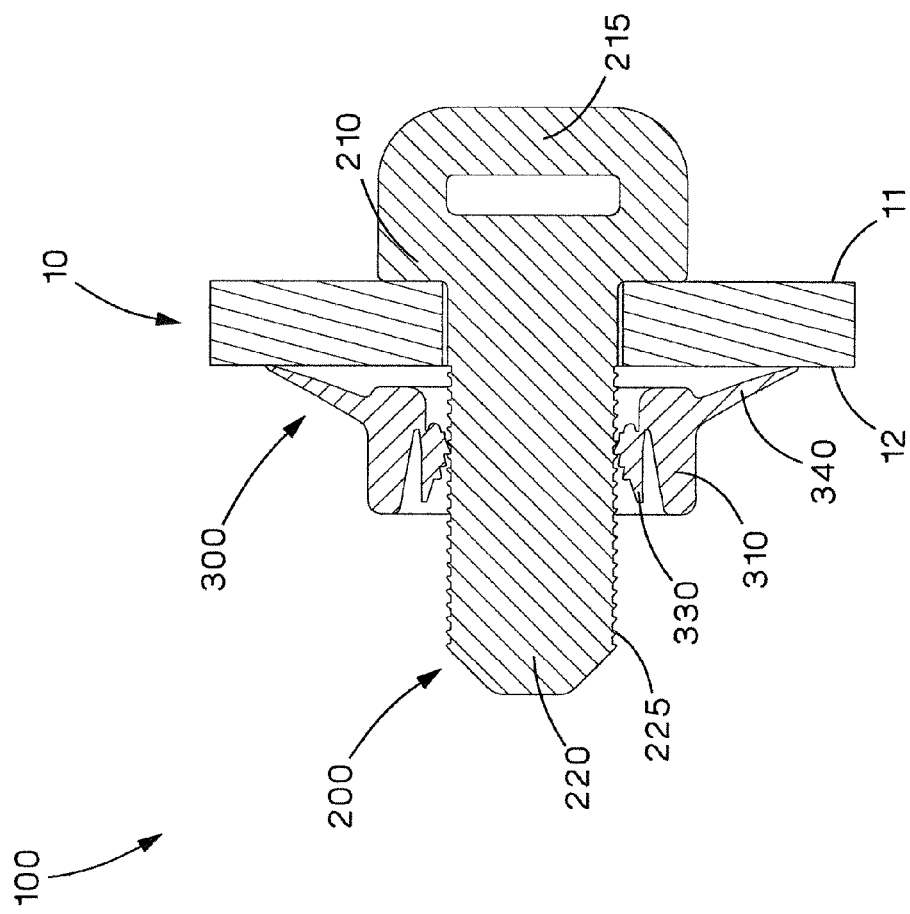
FIG. 13 is a cross-sectional view taken along line 13-13 of FIG. 12.

Referring to FIGS. 10-14, the mount 100 is secured to a support member 10, such as a frame rail for a truck. For example, as best seen in FIG. 11, the support member 10 includes an opening 15 for receiving the mount 100. The shaft 220 of the post 200 is positioned through the opening 15, with the head 220 of the post 220 contacting a first side 11 of the support member 10. The push nut 300 is pushed onto the post 200, with the shaft 220 extending through the opening 320. The skirt 340 contacts a second side 12 of the support member 10. The support member 10 is positioned between the push nut 300 and the post 200.

The push nut 300 is secured to the post 200. In a first direction along the longitudinal axis A of the post 200, as indicated by a first arrow A1 in FIGS. 15-17, the push nut 300 slidingly engages the post 200. For example, when the push nut 300 is pushed onto the post 200, the teeth 225 cause the locking wedges 330 to rotate away from the post 200, which in turn, allows the push nut 300 to slide along the longitudinal axis A of the post 200. However, in a second direction opposite the first direction, as indicated by a second arrow A2 in FIG. 18, the push nut 300 lockingly engages the post 200. For example, when the push nut 300, or more particularly, the skirt 340, contacts the support member 10, the teeth 225 on the post 200 engage the teeth 331 on the locking wedge 330, locking the push nut 300 onto the post 200.

If a sufficient amount of force is applied to the push nut 300, the skirt 340 deflects, allowing the push nut 300 to slide further along the longitudinal axis of the post 200. Additionally, the skirt 340 is resilient, and therefore, biases the push nut 300 in the second direction, improving the locking engagement between the push nut 300 and the post 200, which limits displacement of the mount 100. The skirt 340 may also be referred to as a resilient member.

As shown in FIG. 10, one or more cables 20 are formed into a bundle 30 using a cable tie 40. The cable tie 40, and therefore, the bundle 30 of cables 20, are secured to the mount 100. For example, the cable tie 40 is wrapped around the bundle 30 of cables 20 and inserted through the rung 215 of the mount 100. For clarity, the cable tie 40 and the bundle 30 of cables 20 are not shown in FIGS. 11-14.

Figure 17:
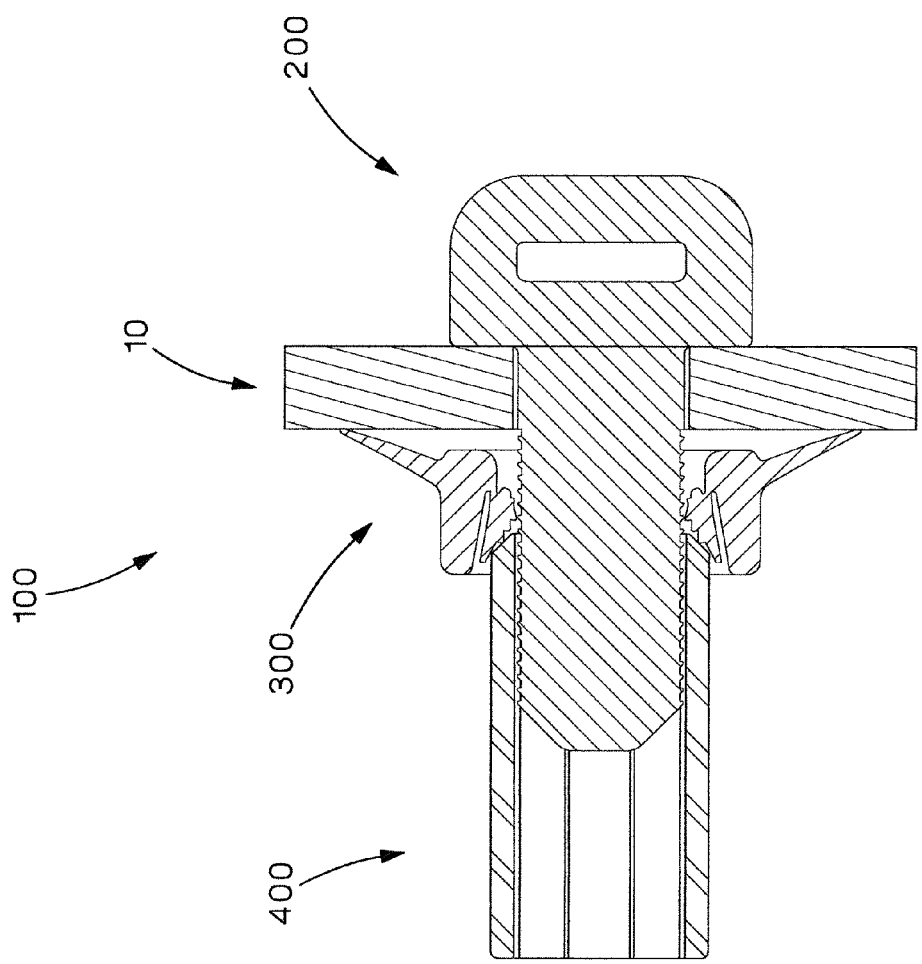
Figure 18:
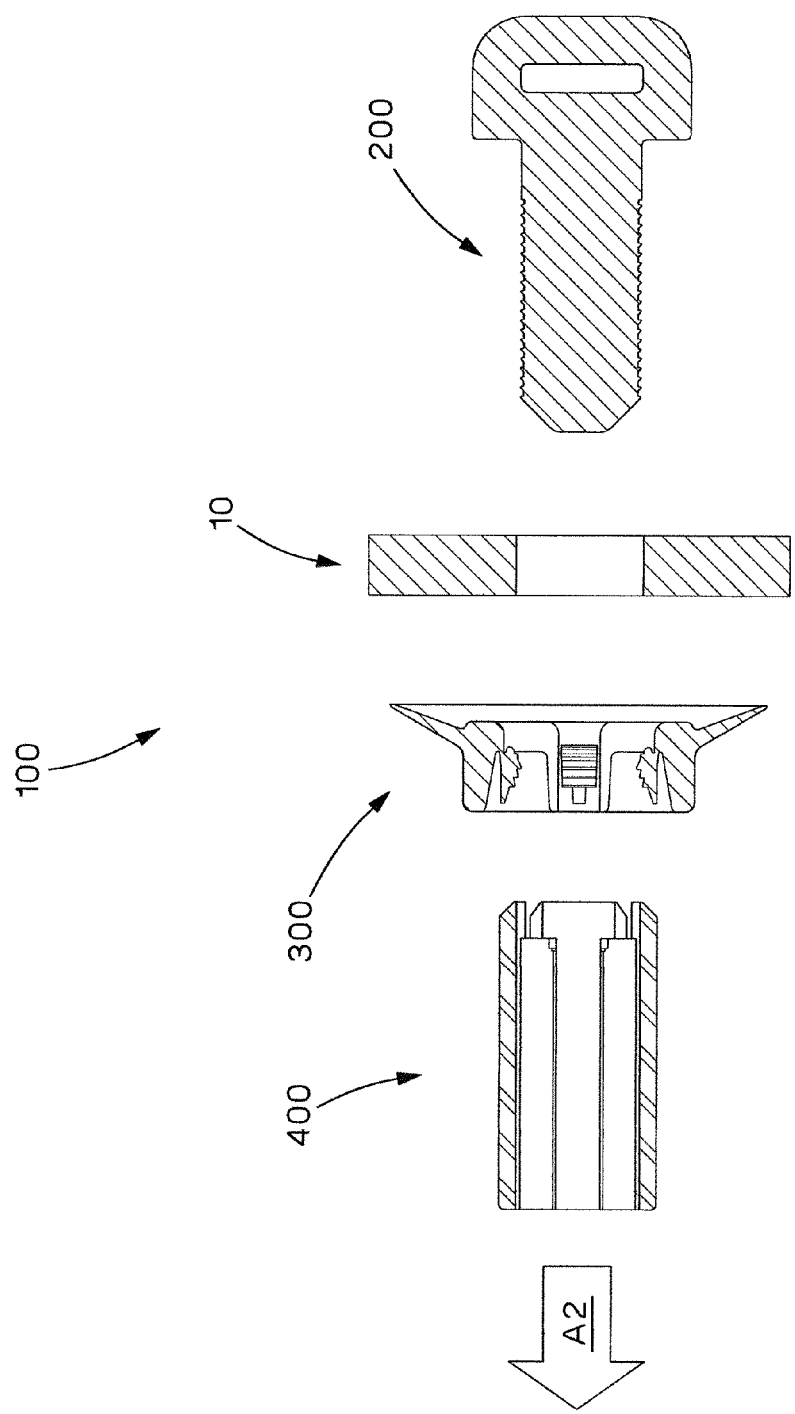
Figure 19:
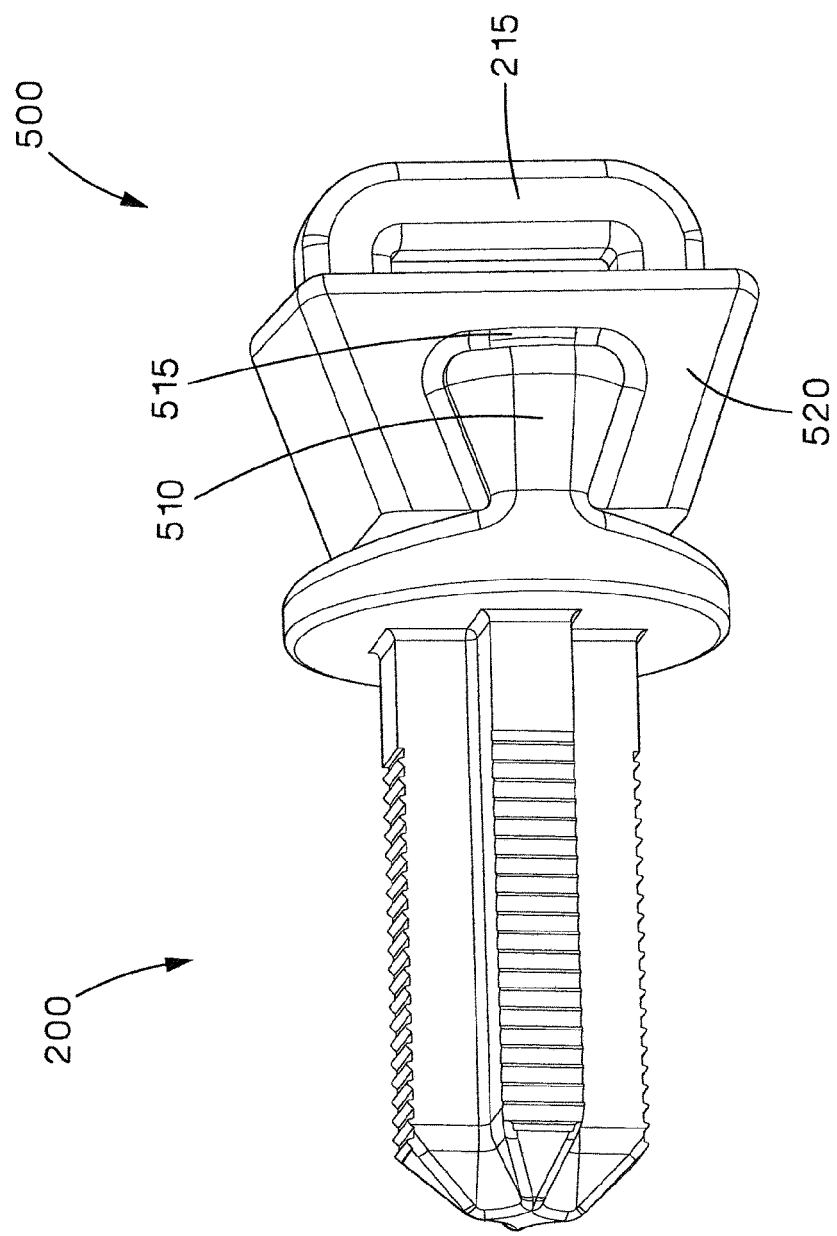
FIG. 19 is a perspective view of a post and a detachable rung component according to an alternative embodiment of the present invention.

Referring to FIGS. 15-18, the push nut 300 is releasable. That is, the push nut 300 may be removed from the post 200. For example, as best seen in FIG. 17, a removal tool 400 engages the release arms 332, causing the locking wedges 330 to rotate away from the post 200.

Although not shown in FIGS. 15-18, the push nut 300 and/or the removal tool 400 may include one or more retention members, such as a projection or a recess, for retaining the push nut 300 on the removal tool 400 when the push nut 300 is removed from the post 200.

Figure 20:
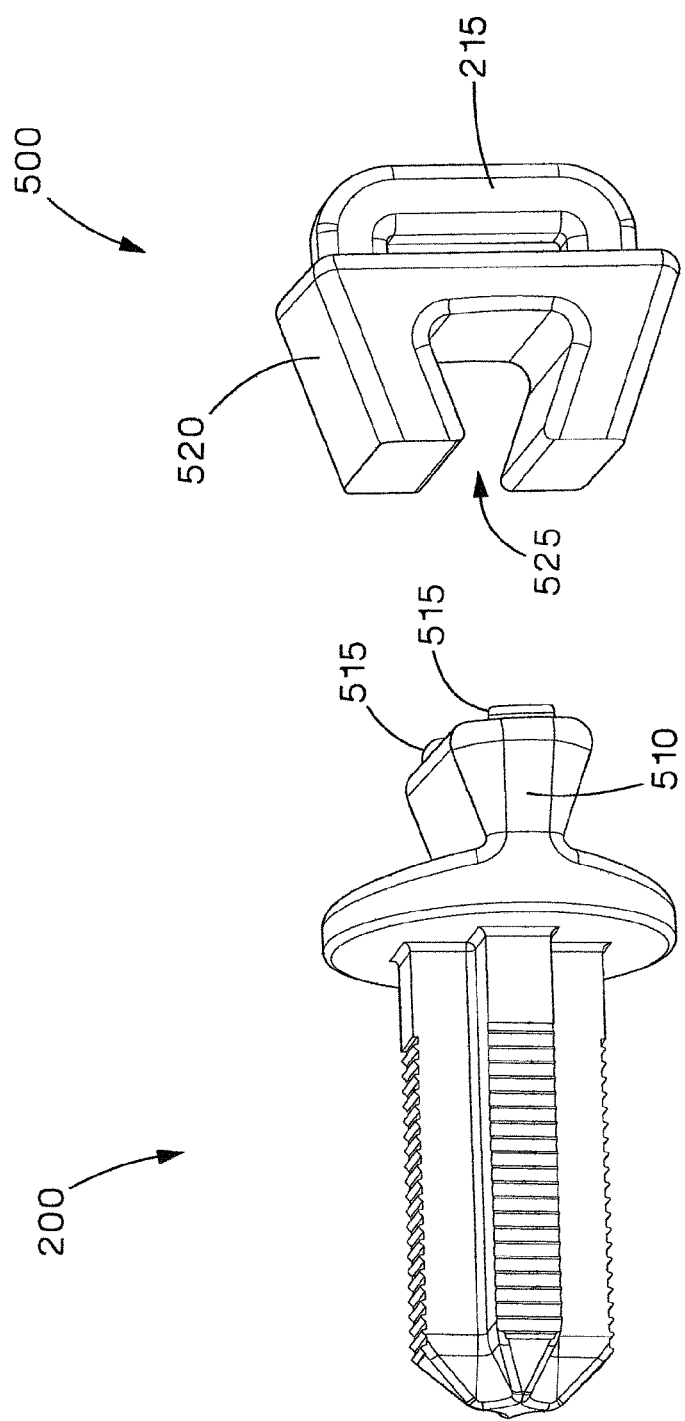
FIG. 20 is an exploded view of the post and the detachable rung component of FIG. 19.
Figure 21:
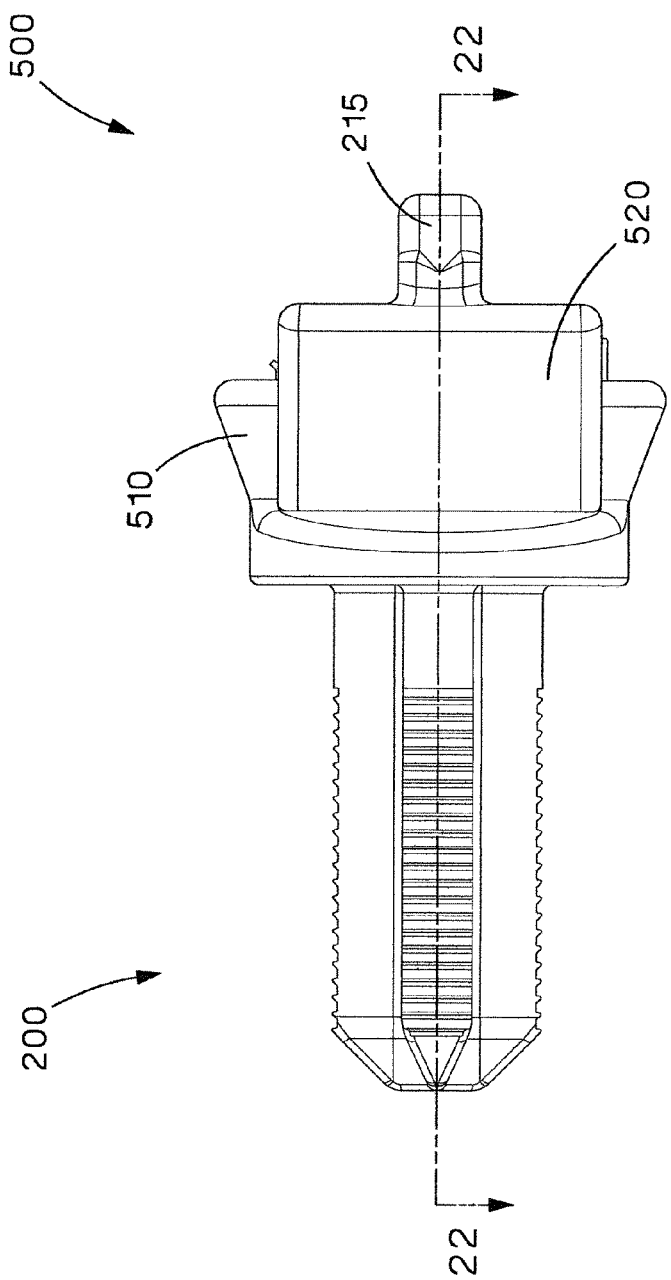
FIG. 21 is a top view of the post and the detachable rung component of FIG. 19.
Figure 22:
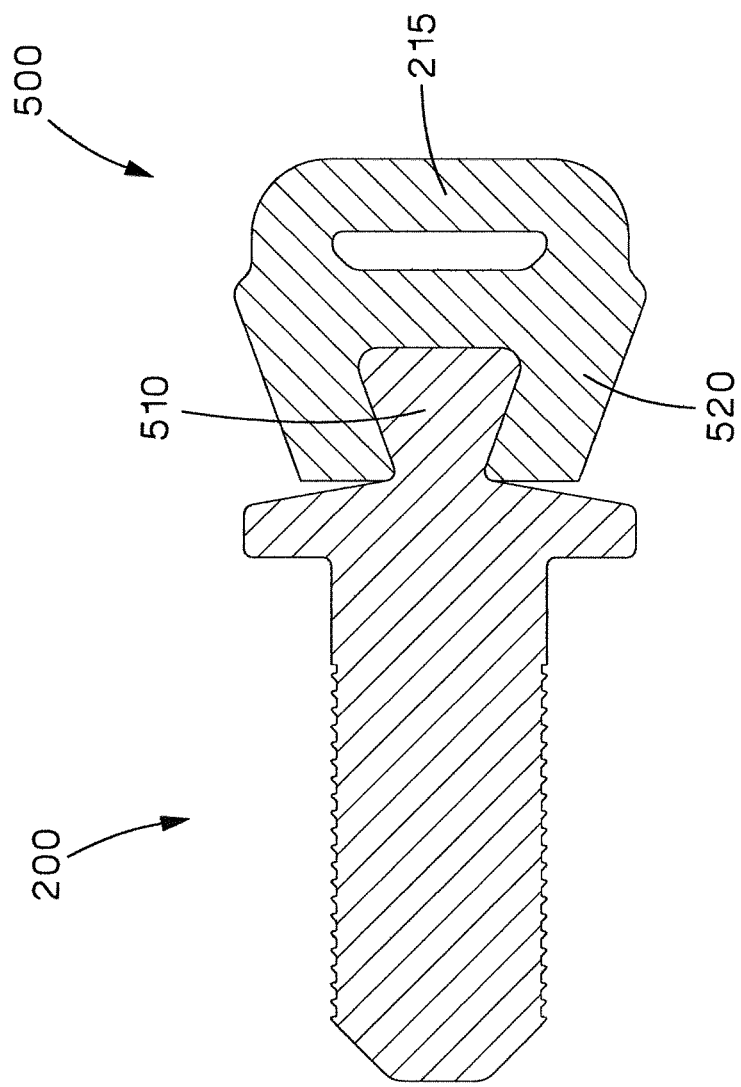
FIG. 22 is a cross-sectional view taken along line 22-22 of FIG. 21.
Figure 23:
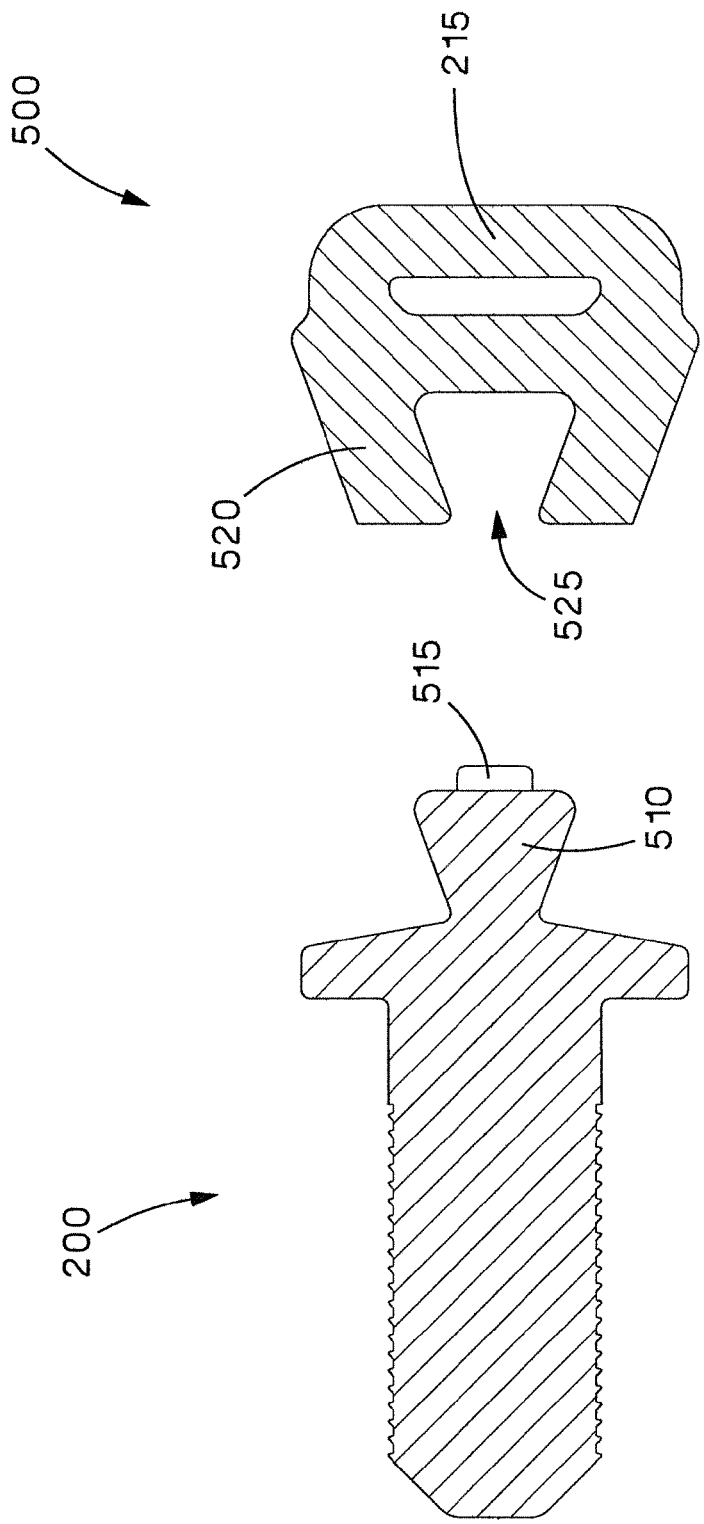
FIG. 23 is an exploded view of FIG. 22.
Figure 24:
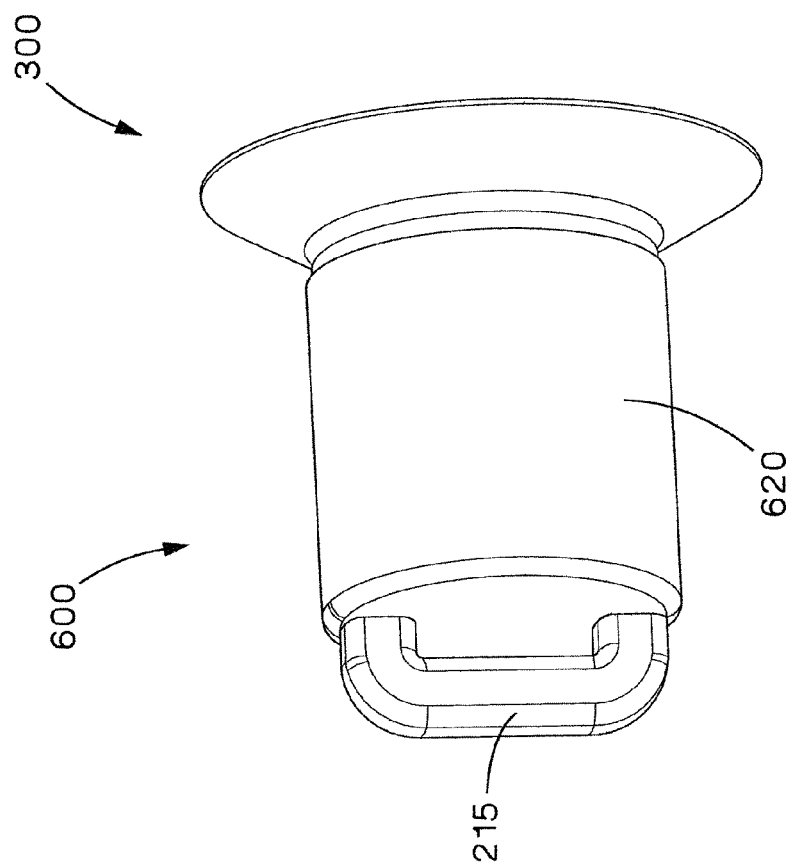
FIG. 24 is a perspective view of a push nut and a detachable rung component according to an alternative embodiment of the present invention.
Figure 38:
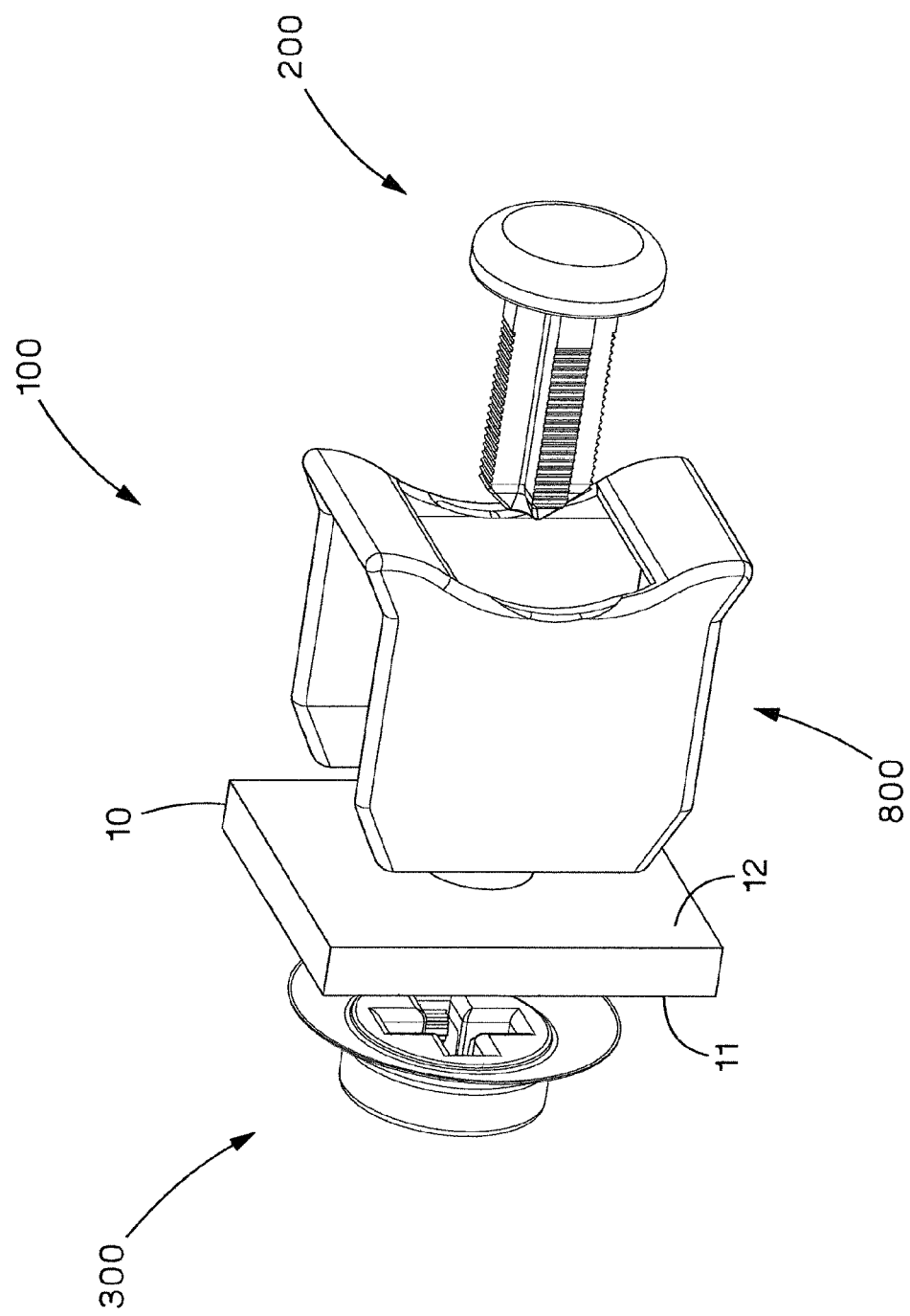
FIG. 38 is an exploded view of a mount according to an alternative embodiment of the present invention.

As shown in FIGS. 1-18, the rung 215 is integrally formed with the head 210 of the post 200. Alternatively, as shown in FIGS. 19-23, the rung 215 may be removably connected to the head 210 of the post 200. For example, as best seen in FIG. 20, the head 210 of the post 200 includes a male connector 510 for engaging a female connector 520, including a slot 525, on a detachable rung component 500. Additionally, the male connector 510 includes a pair of ribs 515 for securing the male connector 510 in the slot 525 of the female connector 520. Another example of a detachable rung component 800 is shown in FIG. 38.

Figure 25:
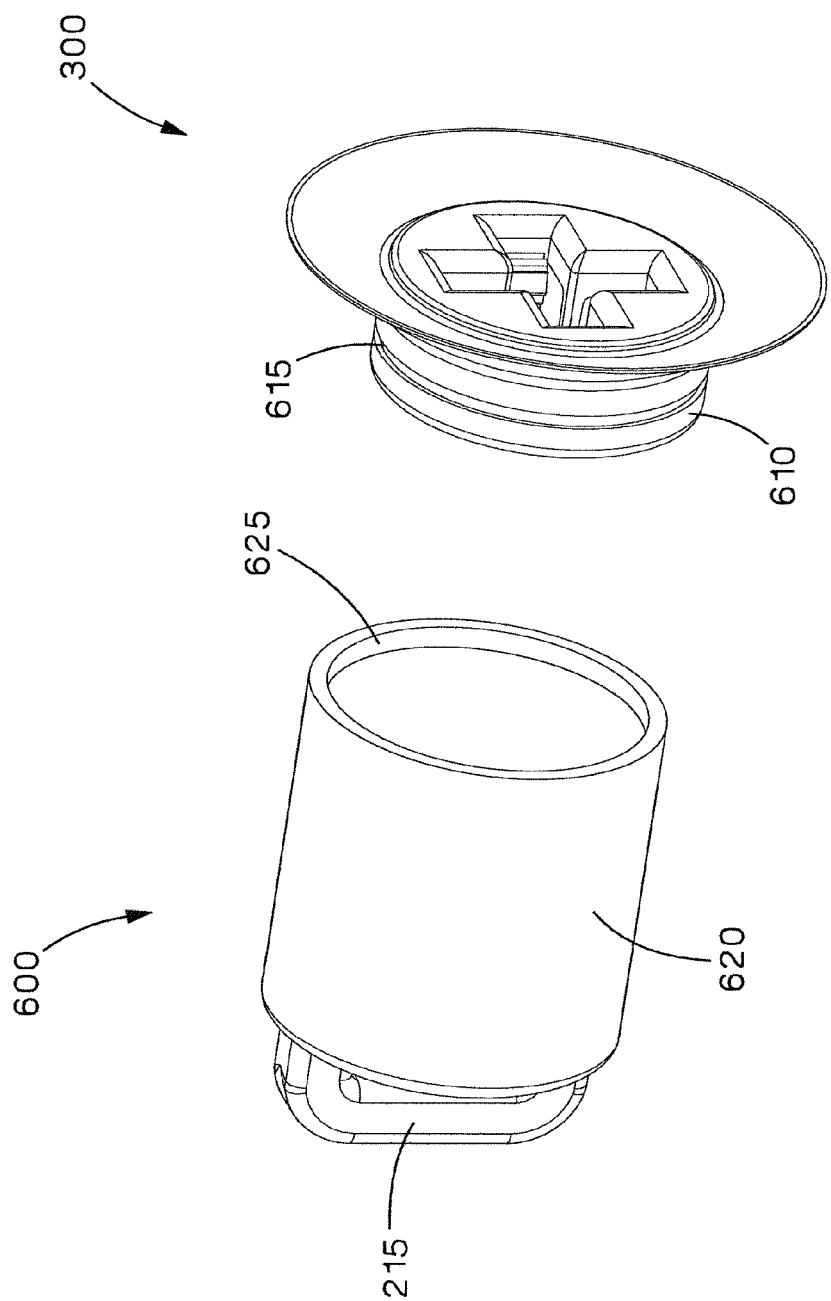
FIG. 25 is an exploded view of the push nut and the detachable rung component of FIG. 24.
Figure 26:
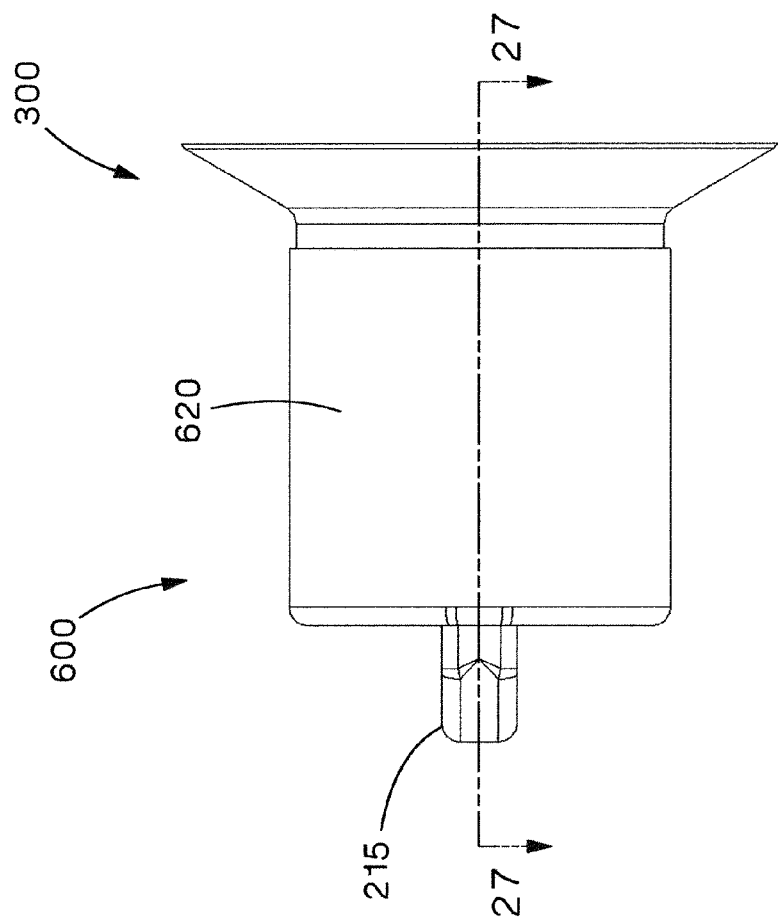
FIG. 26 is a top view of the push nut and the detachable rung component of FIG. 24.
Figure 27:
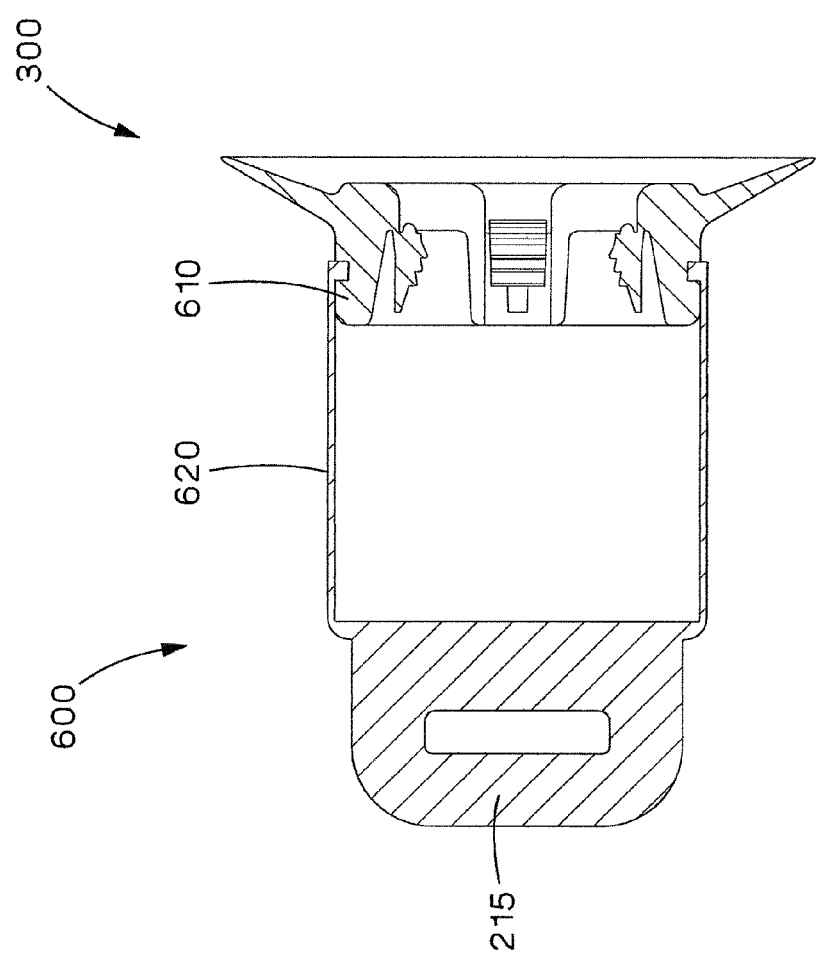
FIG. 27 is a cross-sectional view taken along line 27-27 of FIG. 26.
Figure 28:
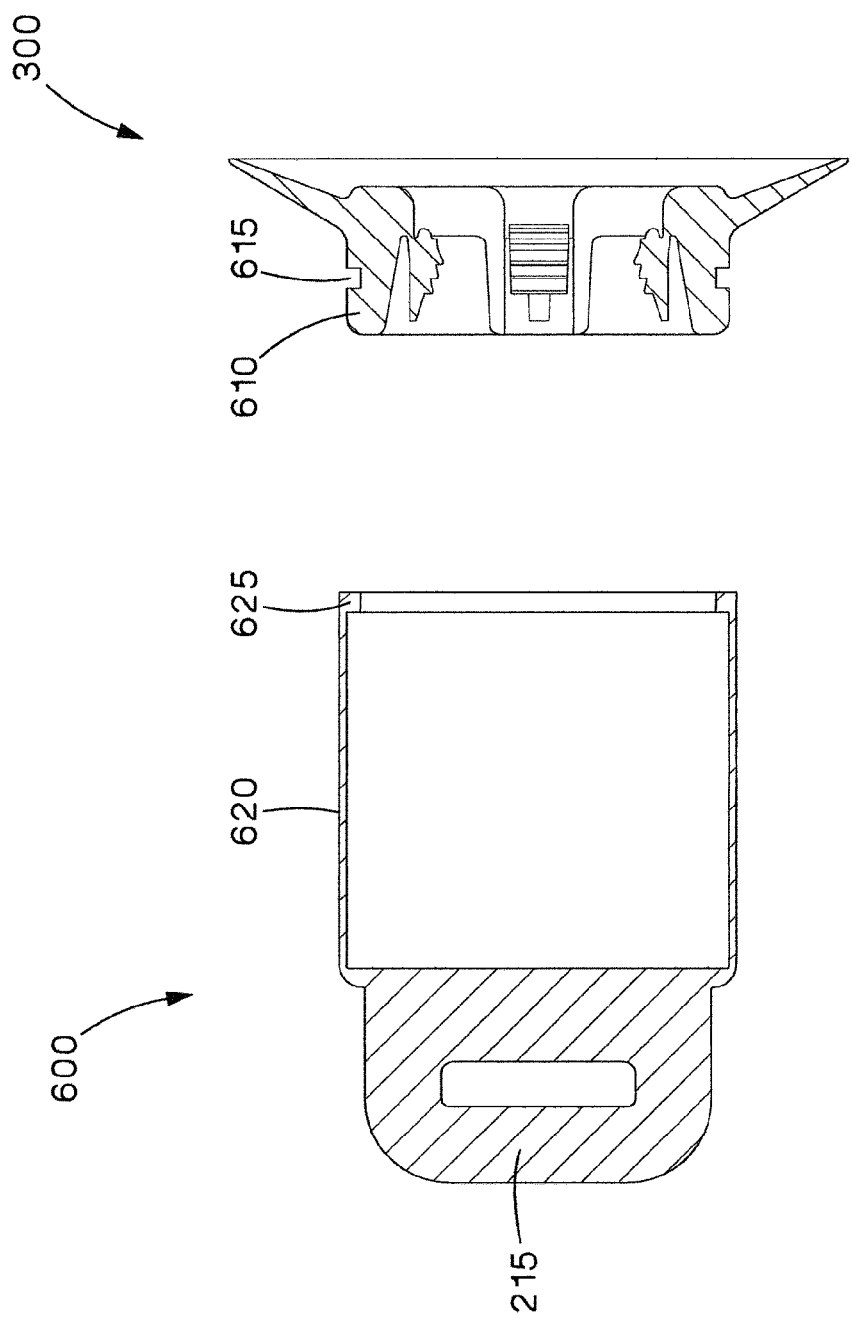
FIG. 28 is an exploded view of FIG. 27.
Figure 29:
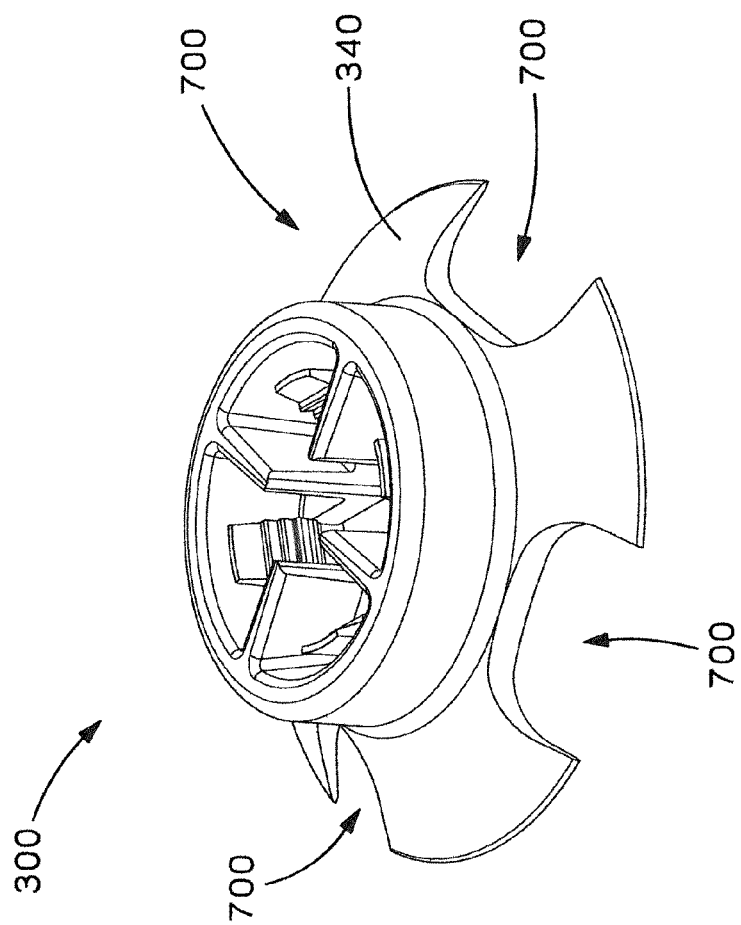
FIG. 29 is a perspective view of a push nut according to an alternative embodiment of the present invention.
Figure 30:
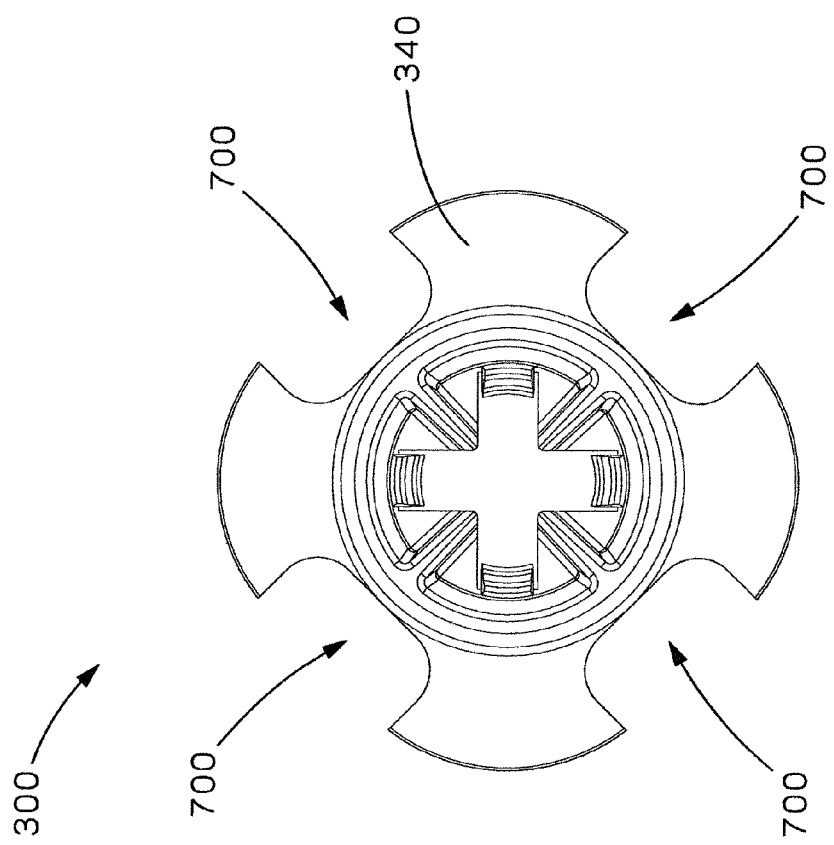
FIG. 30 is a top view of the push mount of FIG. 29.
Figure 31:
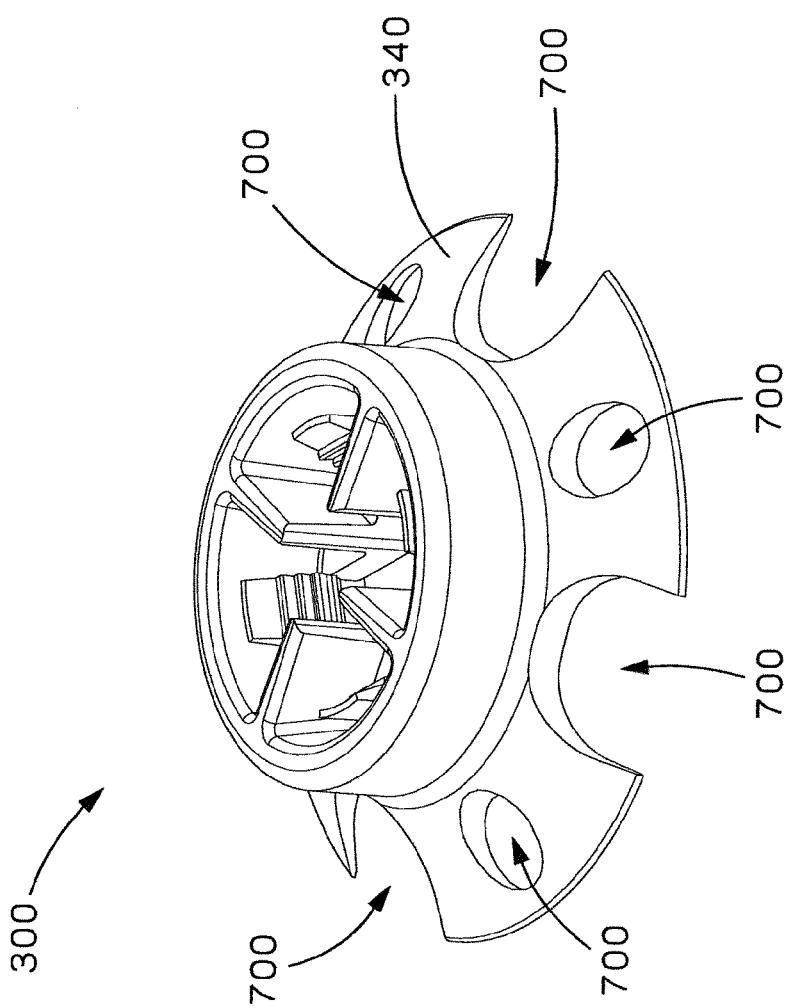
FIG. 31 is a perspective view of a push nut according to an alternative embodiment of the present invention.
Figure 32:
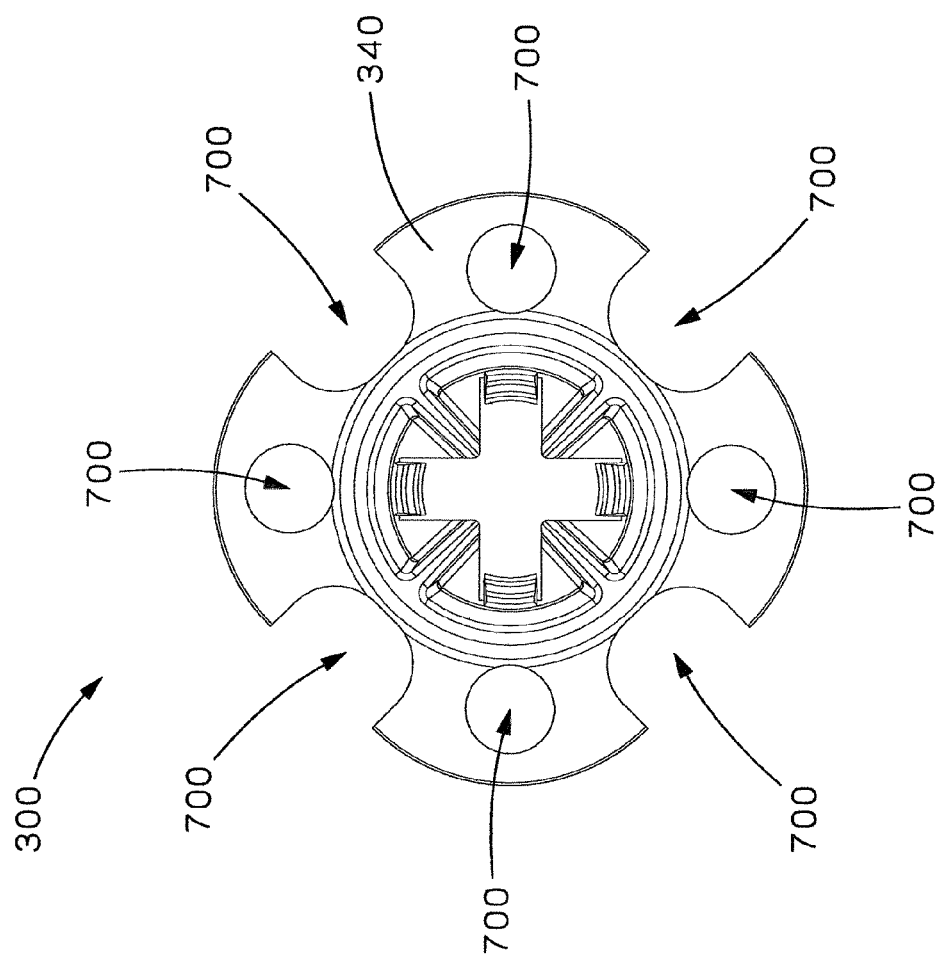
FIG. 32 is a top view of the push mount of FIG. 31.

Additionally, as shown in FIGS. 1-18, the post 200 includes the rung 215. Alternatively, as shown in FIGS. 24-28, the push nut 300 may include the rung 215. For example, as best seen in FIG. 25, the push nut 300 includes a female connector 610, including a groove 615, for engaging a male connector 620, including a rib 625, on a detachable rung component 600. Therefore, the rung 215 is removably connected to the push nut 300, but it is likewise contemplated that the rung 215 is integrally formed with the push nut 300.

As shown in FIGS. 1-18, the skirt 340 of the push nut 300 is solid. Alternatively, as shown in FIGS. 29-32, the skirt 340 includes one or more openings 700, such as cutouts or holes. The openings 700 decrease the amount of force required to deflect the skirt 340, making the push nut 300 easier to install onto the post 200, while still providing a sufficient amount of resiliency to secure the push nut 300 to the post 200.

While the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

What is claimed:

1. A mount comprising:
   a post having a first end, a second end opposite the first end, and a longitudinal axis extending between the first end and the second end, the first end having a rung for receiving a cable tie; and
   a push nut removably connected to the post, the push nut having a first end defined by being configured to initially receive the post and a second end opposite the first end, the push nut further having a body, an opening for receiving the second end of the post along the longitudinal axis, the opening extending entirely through the body, at least one locking wedge rotatably connected to the body and extending therefrom directly into the opening, the at least one locking wedge having a release arm and a plurality of teeth disposed between the body and the release arm, the at least one locking wedge allowing the push nut to slide along the longitudinal axis of the post in a first direction and preventing the push nut from sliding along the longitudinal axis of the post in a second direction opposite the first direction, and a resilient member configured to bias the push nut in the second direction when the resilient member is in contact with a support member, the push nut further having a gap between the release arm and an internal wall of the opening proximate to the second end of the push nut such that the release arm can be moved away from the post in order to disengage the plurality of teeth on the locking wedge from the post further wherein the release arm extends towards the second end of the push nut to a point at least substantially even with the second end of the push nut.

2. The mount of claim 1, wherein the push nut includes a plurality of locking wedges.

3. The mount of claim 1, wherein the resilient member is frustoconical.

4. The mount of claim 1, wherein the resilient member tapers in thickness from a maximum thickness at the push nut to a minimum thickness at a distal end of the resilient member.

5. The mount of claim 1, wherein the shape of the opening in the push nut matches the shape of the post.

* * * * *